US009223916B2

(12) United States Patent
DiLullo et al.

(10) Patent No.: US 9,223,916 B2
(45) Date of Patent: Dec. 29, 2015

(54) TIMING ANALYSIS OF ASYNCHRONOUS CLOCK DOMAIN CROSSINGS

(71) Applicant: International Business Machines Corporation, Armonk, NY (US)

(72) Inventors: Jack DiLullo, Austin, TX (US); Gavin Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/292,260

(22) Filed: May 30, 2014

(65) Prior Publication Data
US 2015/0347652 A1     Dec. 3, 2015

(51) Int. Cl.
*G06F 17/50*     (2006.01)

(52) U.S. Cl.
CPC ................... *G06F 17/5031* (2013.01)

(58) Field of Classification Search
CPC ................................... G06F 17/5031
USPC ......................................... 716/136
See application file for complete search history.

(56) References Cited

U.S. PATENT DOCUMENTS

| 5,650,938 | A | 7/1997 | Bootehsaz et al. | |
|---|---|---|---|---|
| 5,710,910 | A | 1/1998 | Kehl et al. | |
| 7,356,789 | B2 * | 4/2008 | Ly et al. | 716/108 |
| 7,382,824 | B1 | 6/2008 | Marmash et al. | |
| 7,412,678 | B2 * | 8/2008 | Lahner et al. | 716/113 |
| 8,122,410 | B2 | 2/2012 | Dilullo et al. | |
| 8,250,515 | B2 | 8/2012 | Amundson et al. | |
| 8,327,307 | B2 * | 12/2012 | Kronke et al. | 716/134 |
| 8,433,875 | B2 | 4/2013 | Cortadella | |
| 8,560,988 | B2 * | 10/2013 | Sarwary | 716/108 |
| 8,793,639 | B2 * | 7/2014 | Rindner | 716/134 |
| 2009/0293031 | A1 | 11/2009 | Darsow et al. | |
| 2012/0110529 | A1 | 5/2012 | Osborn et al. | |

* cited by examiner

*Primary Examiner* — Jack Chiang
*Assistant Examiner* — Brandon Bowers
(74) *Attorney, Agent, or Firm* — DeLizio Law, PLLC

(57) ABSTRACT

Various implementations of a method, system, and computer program product for executing timing analysis of an asynchronous clock domain crossing are disclosed. In one embodiment, a signal group and a corresponding timing specification are determined for one or more signals of an electronic design. For each of the signals, a clock associated with the signal is renamed based, at least in part, on the signal group associated with the signal. The asynchronous clock domain between a transmit domain and a receive domain is identified in the electronic design based, at least in part, on identifying a signal path associated with one or more renamed clocks that is asynchronous to a clock associated with the receive domain. For each of the one or more renamed clocks, timing analysis is executed across one or more signals associated with the renamed clock at the asynchronous clock domain crossing.

20 Claims, 14 Drawing Sheets

| MODULE | LOCAL GROUP NAME | GLOBAL INSTANCE NAME | GLOBAL GROUP NAME | TIMING SPECIFICATIONS (CLOCK PERIODS) | | | |
|---|---|---|---|---|---|---|---|
| | | | | MAXIMUM LATENCY | | MAXIMUM SKEW | |
| | | | | TRANSMIT | RECEIVE | TRANSMIT | RECEIVE |
| MYMAC | CFG | I2 | CFG2 | NO LIMIT (DEF) | 5 | NO LIMIT (DEF) | 1 (DEF) |
| MYMAC | CFG | I3 | CFG3 | 1.5 | 1 (DEF) | 1 | 1 (DEF) |
| MYMAC | GRAY | I2 | GRAY2 | | | | |
| MYMAC | GRAY | I3 | GRAY3 | | | | |
| YOURMAC | GRAY | I4.MAC | GRAY4M | NO LIMIT (DEF) | 1 (DEF) | NO LIMIT (DEF) | 0.2 |

700 →

| GLOBAL COMP. NAME | DATA PHASE TAG | GLOBAL GROUP NAME | TRANSMIT DOMAIN CLOCK | RECEIVE DOMAIN CLOCK | TIMING SPECIFICATION IN PICOSECONDS (ps) | | | | | |
|---|---|---|---|---|---|---|---|---|---|---|
| | | | | | MAXIMUM LATENCY | | | MAXIMUM SKEW | | |
| | | | | | TRANSMIT | RECEIVE | TARGET | TRANSMIT | RECEIVE | TARGET |
| I2.FF5, I2.FF6 | P_CFG2 @L | CFG2 | P (400ps) | Q (500ps) | NO LIMIT | 5 X 500 = 2500 | 2500 | NO LIMIT | 1 X 500 = 500 | 500 |
| I2.FF5, I2.FF6 | P_GRAY2 @L | GRAY2 | P (400ps) | Q (500ps) | 1.5 X 400 = 600 | 1 X 500 = 500 | 500 | 1 X 400 = 400 | 1 X 500 = 500 | 400 |

| GLOBAL GROUP NAME | DATA PHASE TAG | GLOBAL COMP. NAME | EARLY ARR. TIME (EAT) | LATE ARR. TIME (LAT) | MINIMUM LATENCY | | | MAXIMUM LATENCY | | | MAXIMUM SKEW | | |
|---|---|---|---|---|---|---|---|---|---|---|---|---|---|
| | | | | | ACTUAL (EAT-LOT) | SPEC | VIOLATE? | ACTUAL (LAT-LOT) | SPEC - GB | VIOLATE? | ACTUAL (LATE LAT - EARLY EAT) | SPEC - GB | VIOLATE? |
| CFG2 | P_CFG2 @L | I2.FF5 | 2290 ps | 2590 ps | 2290-130 = 2160ps | 0ps | NO | 2590-130 = 2460ps | 2500-160 = 2340ps | YES | 2590 - 2290 = 300ps | 500-160 = 340ps | NO |
| | | I2.FF6 | 2290 ps | 2590 ps | 2290-130 = 2160ps | 0ps | NO | 2590-130 = 2460ps | 2500-160 = 2340ps | YES | | | |
| GRAY2 | P_GRAY2 @L | I2.FF5 | 460 ps | 460 ps | 460 - 130 = 330ps | | NO | 460-130 = 330ps | 500-160 = 340ps | NO | 460 - 90 = 370ps | 400-160 = 240ps | YES |
| | | I2.FF6 | 90 ps | 90 ps | 90 - 130 = -40ps | | YES | 90-130 = -40ps | | NO | | | |

FIG. 7B

TIMING ANALYSIS OF ASYNCHRONOUS CLOCK DOMAIN CROSSINGS

BACKGROUND

Embodiments of the inventive subject matter generally relate to the field of circuit design, and, more particularly, to timing analysis of asynchronous clock domain crossings.

Computer chips and systems-on-chips may include multiple systems and sub-systems. Each of these systems and sub-systems may include multiple "clock domains." A clock domain is a set of sequential logic elements, such as transparent latches and flip-flops, and combinational logic associated with these sequential logic elements that are clocked by a common clock or by clocks having common frequency and a fixed phase relationship. A clock signal causes a change in the state of sequential logic, such as a flip-flop, latch, register, etc. A clock domain crossing is a path from a sequential logic element, or other source of state transitions in a design, in a first clock domain to a sequential logic element in a second clock domain. The clock in the first clock domain may operate asynchronously with respect to the second clock domain. In such cases, when a data signal path crosses from the first clock domain to the second clock domain, the crossing is referred to as an "asynchronous clock domain crossing." The term "asynchronous" indicates that there is no fixed relationship between the phase of a first clock in the first clock domain and the phase of a second clock in the second clock domain.

SUMMARY

In one embodiment, a signal group and a corresponding timing specification are determined for one or more signal representations of an electronic design. For each of the signal representations, a clock representation associated with the signal representation is renamed based, at least in part, on the signal group associated with the signal representation. The asynchronous clock domain is identified in the electronic design based, at least in part, on one or more renamed clock representations being associated with a signal path in the electronic design. For each of the one or more renamed clock representations associated with the asynchronous clock domain crossing, timing analysis is executed across one or more signal representations that are associated with the renamed clock and that are indicated as crossing between asynchronous clock domains.

BRIEF DESCRIPTION OF THE DRAWINGS

The present embodiments may be better understood, and numerous objects, features, and advantages made apparent to those skilled in the art by referencing the accompanying drawings.

FIG. 7A is an example table illustrating the timing specifications governing each asynchronous clock domain crossing.

FIG. 7B is a table including example comparison of arrival times against corresponding timing specifications for each component in an asynchronous clock domain crossing

DESCRIPTION OF EMBODIMENT(S)

Figure 1:
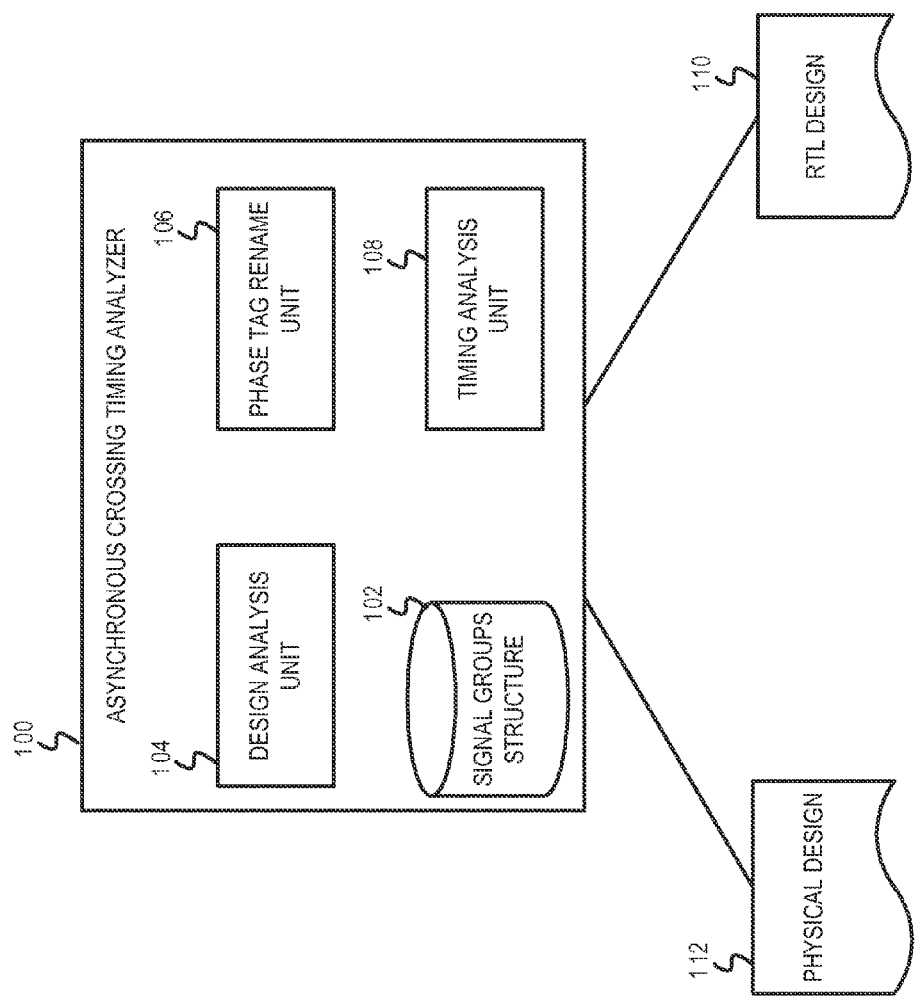
FIG. 1 is an example block diagram illustrating a mechanism for timing analysis of asynchronous clock domain crossings.

The description that follows includes example systems, methods, techniques, instruction sequences, and computer program products that embody techniques of the present inventive subject matter. However, it is understood that the described embodiments may be practiced without these specific details. For instance, although examples refer to using VHDL to indicate timing parameters and signal groups in a register transfer level (RTL) design, embodiments are not so limited. In other embodiments, other suitable programming languages (e.g., the Verilog® hardware description language) may be used to indicate the timing parameters and signal groups in the RTL design. In other embodiments, the timing parameters and signal groups may not be indicated in the RTL design but in a control file or another data structure that is distinct from the RTL design. In other instances, well-known instruction instances, protocols, structures, and techniques have not been shown in detail in order not to obfuscate the description.

This description refers to signals and clocks. In the context of simulation and design analysis, reference to a signal is actually a simulated signal or representation of a signal. Similarly, reference to a clock is actually a simulated clock or virtual clock.

When an electronic design includes an asynchronous clock domain crossing bridging a transmit domain and a receive domain, a logic component may receive data clocked by a transmit domain clock at any time relative to the rising/falling edge of a receive domain clock (e.g., including during the setup time or hold time of a receive domain component). Accordingly, asynchronous clock domain crossings can be sources of error in chip design. Typically, when a tool performing static timing analysis determines that a logic component receives asynchronous data (e.g., when an input data signal and an input clock signal reference asynchronous clocks), the tool suppresses timing analysis on these signal paths. For example, the tool may suppress testing that the input data signal is stable during the setup and hold time of the receive domain component if the data and clock inputs refer to asynchronous clocks (also referred to as phase pair exclusion). Static timing analysis may require a designer to identify and write custom timing assertions for each asynchronous clock domain crossing (also referred to herein as "asynchronous crossing") which can be time and labor intensive. Using gate-level (post-synthesis) simulation with timing delay information to simulate and detect timing problems that were not detected by static timing analysis may also be a time-intensive process, suitable only for small portions of a larger design (e.g., a processor, a system-on-a-chip (SoC), etc.). In addition, the accuracy of the gate level simulation may rely on the range of test patterns that drive the simulation. Furthermore, design verification and timing analysis are independently performed based on a RTL design. However, the RTL design is an abstraction and is typically not associated with any timing information unless the timing information is back-annotated. Therefore, timing assumptions that are made during timing analysis may be different from the timing assumptions that are made during design verification. This can cause the design to be inaccurately modeled during the design verification, possibly resulting in operating flaws once the design is fabricated.

An RTL design can be updated to include timing specifications (in terms of transmit domain and/or receive domain clock periods) associated with one or more signals (e.g., data signals, configuration signals, etc.) in the RTL design. For each module in an electronic design, a signal can be assigned to a signal group based on timing specifications associated with the signal. For each signal, a clock that controls the signal may be renamed to reference the clock and the signal group to which the signal belongs. An asynchronous clock domain crossing may be identified at a receive component whose data input and clock input are driven by asynchronous clocks. The data input may include one or more renamed clocks controlling a single signal path. Because the renamed clocks reference the signal groups (e.g., each having different timing specifications), an asynchronous clock domain crossing that is associated with one or more renamed clocks may be analyzed separately for each of the renamed clocks and consequently each set of timing specifications. By classifying signals into signal groups based on their timing specifications, a group of signals within a signal group can be evaluated independently of the other signal groups. For example, timing analysis may be performed across the signals that belong to a common signal group and that are associated with a common set of timing specifications. Furthermore, indicating timing specifications for groups of signals in an RTL design can ensure consistency between the timing analysis process and design verification when the design includes an asynchronous clock domain crossing. Indicating the timing specifications in the RTL design in terms of clock periods instead of absolute time units can make the RTL design portable across different physical implementations and different operating frequencies.

FIG. 1 is an example block diagram illustrating a mechanism for timing analysis of asynchronous clock domain crossings. FIG. 1 depicts an asynchronous crossing timing analyzer 100. The asynchronous crossing timing analyzer 100 includes a signal groups structure 102, a design analysis unit 104, a phase tag rename unit 106, and a timing analysis unit 108. FIG. 1 also illustrates the asynchronous crossing timing analyzer 100 accessing a register transfer level (RTL) design 110 and a physical design 112 for performing operations that will be described below. In the RTL design 110, a language such as VHDL (VHSIC Hardware Description Language) or the Verilog HDL can be used to describe and model the logical behavior of a circuit. In some embodiments, the RTL design 110 can be synthesized into the physical design 112 to determine how physical components of the circuit design will be laid onto an electronic chip. Alternatively, other suitable techniques may be used to generate the physical design 112 from the RTL design 110. In some cases, the physical design 112 can be stored as a graph including nodes and edges. The edges correspond to wires and the nodes correspond to circuit components. These edges can be referred to as nets, and the set of all elements that comprise the graph can be referred to as a netlist.

Figure 2:
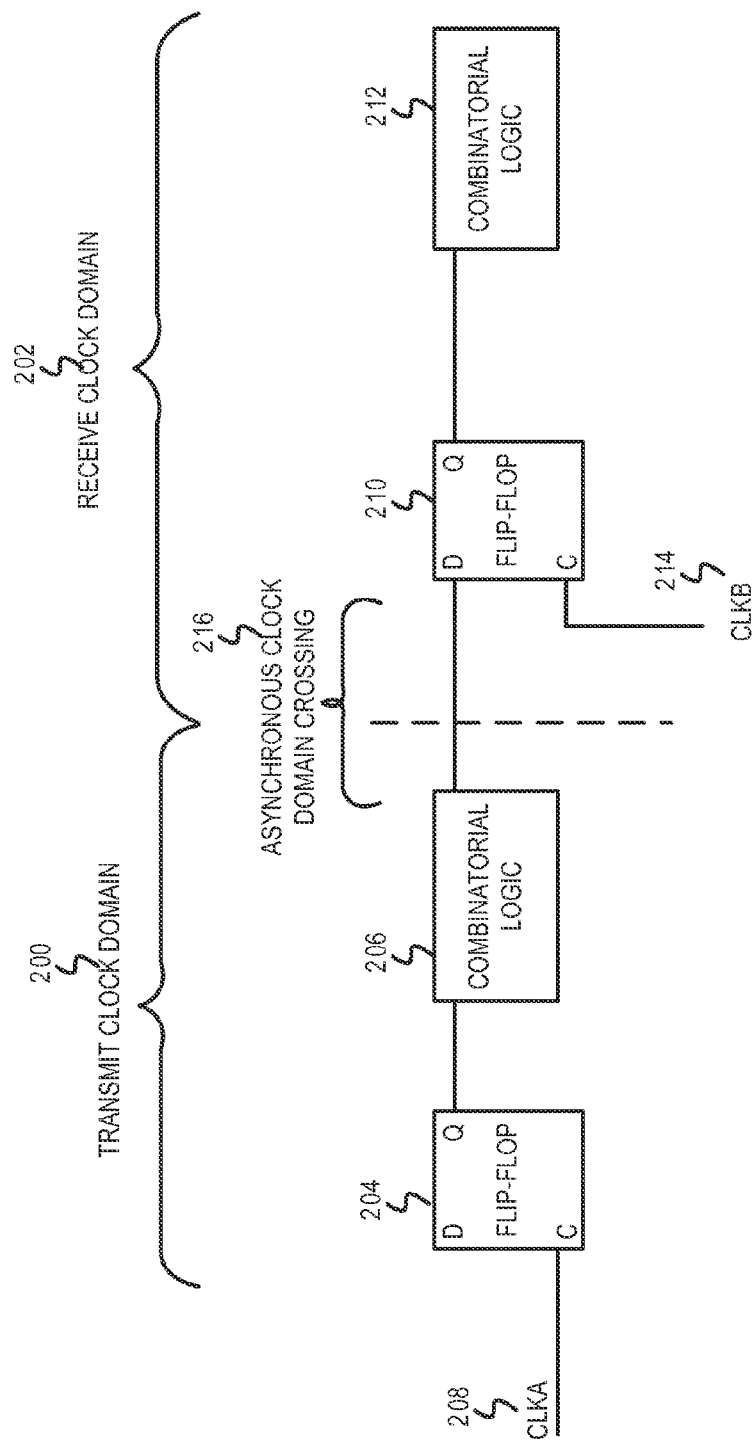
FIG. 2 is a block diagram that illustrates an example asynchronous clock domain crossing.

FIG. 2 is a block diagram that illustrates an example asynchronous clock domain crossing. FIG. 2 depicts a transmit clock domain 200 and a receive clock domain 202. The transmit clock domain 200 includes a flip-flop 204 and combinatorial logic 206. The flip-flop 204 (and combinatorial logic 206) are controlled by a first clock (CLKA) 208. CLKA 208 may also be referred to as a transmit clock, since CLKA 208 governs state changes associated with the flip-flop 204. The transmit clock, the flip-flop 204, and the combinational logic 206 each belong to the transmit clock domain 200. The receive clock domain 202 includes a flip-flop 210 and combinatorial logic 212. The flip-flop 210 (and combinatorial logic 212) are controlled by a second clock (CLKB) 214. CLKB 214 may also be referred to as a receive clock, since CLKB 214 governs state changes associated with the flip-flop 210. The receive clock 214, the flip-flop 210, and the combinational logic 212 each belong to the receive clock domain 202. The signal generated by the flip-flop 204 is processed by the combinatorial logic 206 and provided from the transmit clock domain 200 to the flip-flop 210 in the receive clock domain 202. This signal path between a component (e.g., the flip-flop 204) in the transmit clock domain 200 and a component (e.g., the flip-flop 210) in the receive clock domain 202 is referred to as the asynchronous clock domain crossing 216.

Referring back to FIG. 1, the asynchronous crossing timing analyzer 100 can implement functionality for timing signals on the asynchronous clock domain crossing. As will be further described below, signal groups can be defined in a hierarchical or modular design of the RTL design 110. Each signal group can be associated with independent clock-period-based timing specifications for timing parameters (e.g., latency, skew, etc.). Each signal group may also include one or more signals that pass through asynchronous clock domain crossings. In some embodiments, the signal groups, the signals that are assigned to each signal group, and the timing specifications associated with each signal group may be stored in the signal groups structure 102. In other embodiments, the signal groups, the signals that are assigned to each signal group, and the timing specifications associated with each signal group may be stored as part of the RTL design 110.

The design analysis unit 104 may analyze the RTL design 110 and identify modules or portions of the RTL design 110. Additionally, the design analysis unit 104 may analyze the RTL design 110 and identify multiple instances of the module within the electronic design. In some embodiments, modules and module instances may be specified in the RTL design 110 using features of the design language (e.g., VHDL, Verilog, etc.) associated with the RTL design 110. The physical design 112 may be synthesized from the RTL design 110 and may or may not include indications of the modules and the module instances. For example, the physical design may be "flat," where all module boundaries are removed so that the physical design 112 only includes the logic components and interconnections. However, each module may be independent of the other modules. Additionally, each instance of the module may be independent of other instances of the same module ("module instance"). Furthermore, logic components and interconnections in a physical design that resulted from a particular module or module instance in the RTL design may be independent of logic components and interconnections that resulted from a different module or module instance, even when module boundaries are removed from the physical design. Therefore, the timing analysis unit 108 may independently perform timing analysis on each module instance, or on logic components and interconnections resulting from each module instance. The phase tag rename unit 106 may automatically rename a clock associated with each signal in the physical design 112 to reference the clock, the signal group to which the signal belongs, and the module instance to which the signal belongs. Renaming the clock associated with each signal can help generate independent signal paths for timing asynchronous clock domain crossings. The asynchronous clock domain crossing can be identified at a component whose data input and clock input are controlled by different, asynchronous clocks. The data input may be received via a signal path that is controlled by one or more renamed clocks (e.g., clocks that reference one or more distinct signal groups). For each renamed clock at the asynchronous clock domain crossing, the timing analysis unit 108 can identify timing specifications associated with the corresponding signal group. For a particular signal group, the timing analysis unit 108 can determine whether arrival times of the signal within the signal group comply with timing specifications associated with the signal group. Thus, an asynchronous clock domain crossing may be analyzed separately for each of the renamed clocks (e.g., each signal) based on the appropriate timing specifications.

Figure 3:
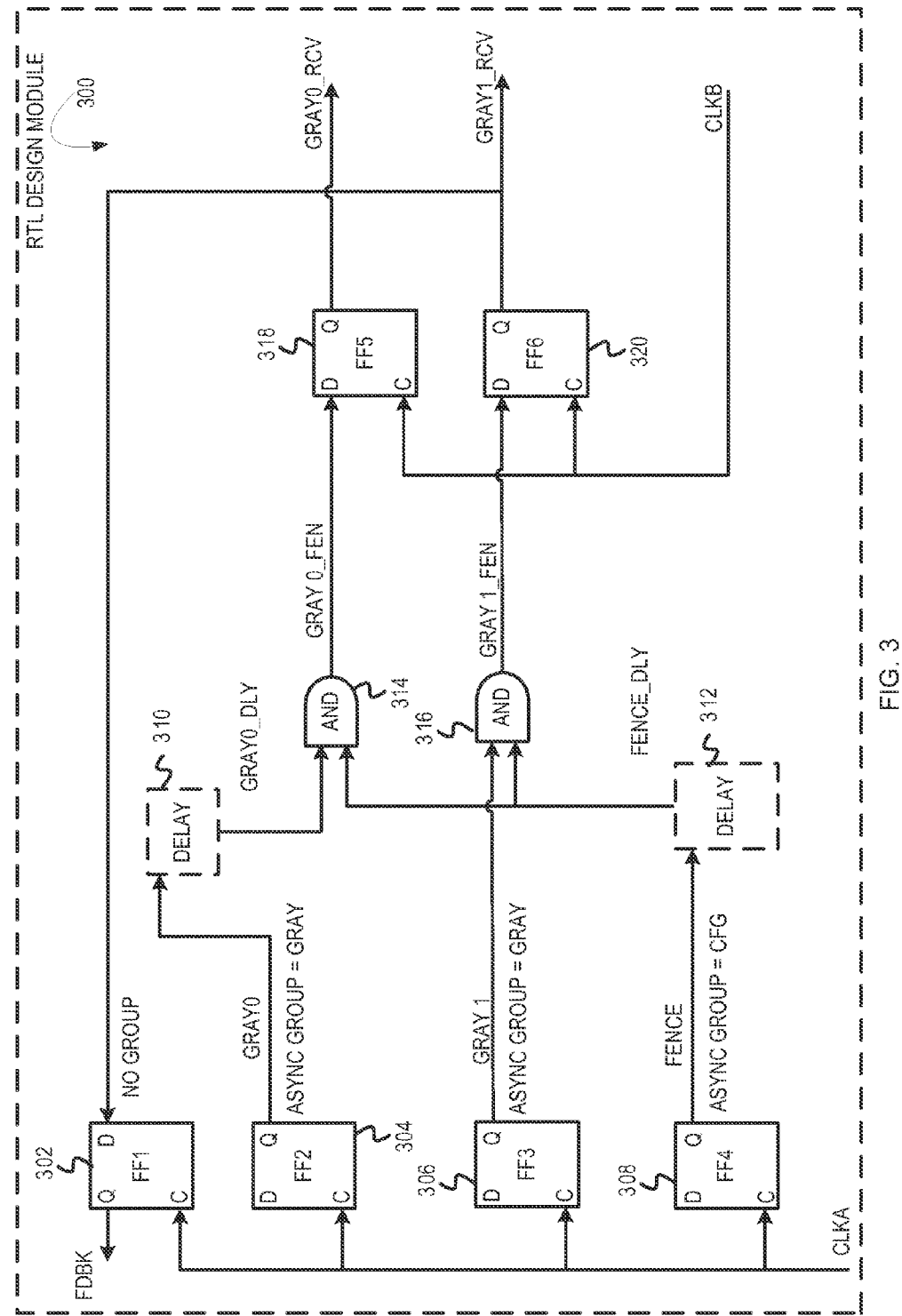
FIG. 3 is an example RTL circuit design illustrating assigning signals generated by components in a module to an appropriate signal group.

FIG. 3 is an example RTL circuit design 300 illustrating multiple clock domains and asynchronous clock domain crossings. Subsequent operations for timing asynchronous clock domain crossings will be described with reference to the example of FIG. 3. FIG. 3 depicts flip-flops 302, 304, 306, and 308 in a first clock domain. The flip-flops 302, 304, 306, and 308 may also be referred to as flip-flops FF1, FF2, FF3, and FF4 respectively. The output of flip-flops 304, 306, and 308 are signals GRAY0, GRAY1, and FENCE respectively. Each of the flip-flops 302, 304, 306, and 308 is clocked by clock signal CLKA, or clock domain A. The outputs of flip-flops 304 and 308 are provided to delay elements 310 and 312 respectively. The delay elements 310 and 312 are depicted using dashed blocks to indicate that the delay may be introduced by circuit components and interconnections in the electronic design. For example, the delay elements 310 and 312 may represent combinational logic delays (e.g., delays introduced by AND logic gates, OR logic gates, etc.) As another example, the delay elements 310 and 312 may represent wire/transmission delays. In some embodiments, however, the delay elements 310 and/or 312 may be actual delay components that are specifically introduced into a signal path to delay a signal and to meet timing specifications.

The outputs of the delay elements 310 and 312 are signals GRAY0_DLY and FENCE_DLY respectively. The outputs of the delay elements 310 and 312 are provided to AND logic gate 314. For example, the signals GRAY0 and FENCE transmitted by the flip-flops 304 and 308 respectively may undergo various processing delays at the respective flip-flops and/or transmission delays. The resultant delayed signals are represented by GRAY0_DLY and FENCE_DLY and are provided to the AND logic gate 314. The outputs of the flip-flop 306 and the delay element 312 are provided to AND logic gate 316. As described in the above example, the signal FENCE transmitted by the flip-flop 308 may undergo various processing delays at the flip-flop 308 and/or transmission delays. The GRAY1 signal transmitted by the flip-flop 306 may undergo minimal processing and/or transmission delays. The AND logic gate 316 may receive the signal GRAY1 (with minimal delay, not depicted in FIG. 3) and the signal FENCE_DLY (after processing/transmission delays). The output of the AND logic gates 314 and 316 are signals GRAY0_FEN and GRAY1_FEN respectively. The output of the AND logic gates 314 and 316 are provided to flip-flops 318 and 320. The flip-flops 318 and 320 are also referred to as flip-flops FF5 and FF6. The flip-flops 318 and 320 belong to a second clock domain and are clocked by clock signal CLKB, or clock domain B. The outputs of the flip-flops 318 and 320 are the signals GRAY0_RCV and GRAY1_RCV respectively. The output of the flip-flop 320 is provided as feedback to the input of the flip-flop 302.

The input signals GRAY0_FEN and GRAY1_FEN at the input of the flip-flops 318 and 320 respectively travel from one clock domain to another. The signals GRAY0_FEN and GRAY1_FEN represent a Gray-coded bus. For proper operation of the Gray-code, the signal GRAY0_FEN should arrive at the flip-flop 318 within 1 transmit clock period of the signal GRAY1_FEN arriving at the flip-flop 320 and vice versa. For example, if clock domain A is clocked at 1 GHz (i.e., clock period of 1 ns), flip-flop 304 may transition and generate the GRAY0 signal on one clock cycle; while flip-flop 306 may transition and generate the GRAY1 signal on the next clock cycle (e.g., after 1 ns). In this example, the signal path between the flip-flop 304 and the flip-flop 318 and between the flip-flop 306 and the flip-flop 320 are asynchronous clock domain crossings. The asynchronous crossing timing analyzer 100 can execute timing analysis on the signal path between flip-flops 304 and 318 and the path between flip-flops 306 and 320 to ensure that the GRAY0_FEN signal and the GRAY1_FEN signal arrive at their respective destination component in accordance with the timing specifications associated with the GRAY0, GRAY1, and FENCE signals.

Operations for executing timing analysis on asynchronous clock domain crossings may be described by the following steps: 1) indicating timing specifications for signals in the RTL design, 2) assigning one or more signals to a signal group based on the timing specifications, 3) generating global signal group information for uniquely identifying signals across different modules and across multiple instances of the same module, 4) renaming clocks that govern each signal group to enable independent timing analysis of each of the different signal groups across different modules and across multiple instances of the same module, 5) determining timing specifications for each component associated with asynchronous clock domain crossings, and 6) determining whether arrival times at each component associated with asynchronous clock domain crossings comply with the corresponding timing specification.

The RTL design is typically used for both creating the physical design on which the timing analysis operations are performed, and for design verification operations. The design verification operations may be executed to verify the function of the circuit design; while the timing analysis operations may be executed to analyze timing of the circuit design. The timing analysis operations and the design verification operations may be executed independently of each other. As discussed above, the timing analysis operations are performed on the physical design. The RTL design typically does not include timing information (e.g., physical delay information)

that is used for timing analysis. This can result in inconsistencies between the timing analysis operations and the design verification operations when the circuit design includes one or more asynchronous clock domain crossings. Therefore, in some embodiments, timing specifications that govern the timing analysis operations may be incorporated into the RTL design to influence both the timing analysis operations and the design verification operations and for consistency between the timing analysis operations and the design verification operations. Incorporating the timing specifications into the RTL design can ensure that the timing specifications are preserved through logic synthesis to the physical design. The timing specifications incorporated in the RTL design may then be used for executing the timing analysis operations on the physical design. Incorporating the timing specifications into the RTL design can ensure that the timing specifications (that are used for the timing analysis operations) are also used for the design verification operations. Additionally, the RTL design including the timing specifications may also be used for logic synthesis, allowing synthesis to appropriately constrain asynchronous domain crossings. In some embodiments, the timing specifications can be incorporated (e.g., by a designer) into the RTL design by using "attributes." Attributes can refer to a language feature that are used to indicate additional information about a component in the RTL design. For example, a timing type attribute can refer to a label that is assigned to a net or component of a computer readable design to indicate characteristics about a signal associated with the net or the component. Alternatively, the timing specifications for components and/or signals in the RTL design may be indicated in a control file or another suitable data structure associated with the RTL design.

In some embodiments, timing specifications can be specified for timing parameters such as minimum latency, maximum latency, and maximum skew. Latency can refer to the delay from the transmit clock domain to the receive clock domain. Skew can refer to the difference in arrival times among a group of signals. For example, the maximum skew may be determined as the difference between the late arrival time of a signal in the signal group and the early arrival time of another signal in the same signal group. In some embodiments, the timing specifications may be expressed in terms of the clock period associated with the transmit domain clock ("transmit domain clock period") or the clock period associated with the receive domain clock ("receive domain clock period"). The RTL design is typically independent of a specific operating frequency but may depend on the relative clock frequency (e.g., difference between the transmit domain clock and the receive domain clock). Expressing the timing specifications in terms of clock periods can make the RTL design portable across different physical implementations of the RTL design. For example, the same RTL design may be used to generate two electronic chips—one that operates at 1 GHz and another that operates at 2 GHz. The timing specifications associated with either electronic chip is not affected when the timing specifications are indicated in terms of a number of transmit domain clock periods or receive domain clock periods. For example, a latency timing specification of 1 clock period translates to a 1 ns (nanosecond) latency timing specification in the 1 GHz electronic chip and to a 0.5 ns latency timing specification for the 2 GHz electronic chip.

In one implementation, as depicted in Table 1, each signal path in the RTL design may be associated with six timing parameters: 1) minimum latency specified in terms of transmit domain clock periods (MIN_LATENCY_XMIT), 2) minimum latency specified in terms of receive domain clock periods (MIN_LATENCY_$RCV$), 3) maximum latency specified in terms of transmit domain clock periods (MAX_LATENCY_XMIT), 4) maximum latency specified in terms of receive domain clock periods (MAX_LATENCY_RCV), 5) maximum skew specified in terms of transmit domain clock periods (MAX_SKEW_XMIT), and 6) maximum skew specified in terms of receive domain clock periods (MAX_SKEW_RCV). Additionally, each of the timing parameters may also have default values. For example, the MIN_LATENCY_XMIT and the MIN_LATENCY_RCV timing parameters may each have a default value of 0 clock periods. As another example, the MAX_LATENCY_XMIT and MAX_SKEW_XMIT timing parameters may each have a "no limit" default value. As another example, the MAX_LATENTCY_RCV and the MAX_SKEW_RCV timing parameters may each have a default value of 1 receive domain clock period.

TABLE 1

| Parameter | Description | Default Value |
|---|---|---|
| MIN_LATENCY_XMIT | Minimum latency in terms of transmit domain clock periods | 0.0 |
| MIN_LATENCY_RCV | Minimum latency in terms of receive domain clock periods | 0.0 |
| MAX_LATENCY_XMIT | Maximum latency in terms of transmit domain clock periods | No limit |
| MAX_LATENCY_RCV | Maximum latency in terms of receive domain clock periods | 1.0 |
| MAX_SKEW_XMIT | Minimum skew in terms of transmit domain clock periods | No limit |
| MAX_SKEW_RCV | Minimum skew in terms of receive domain clock periods | 1.0 |

However, in other implementations, a greater or fewer number of timing parameters may be specified for each path in the RTL design. Furthermore, each of the timing parameters may have other suitable default values. In some embodiments, the default values may be assigned to timing parameters based, at least in part, on the clock domain and/or design hierarchy.

The RTL design may include multiple modules that are interconnected with each other. A module (also referred to an entity or a macro) may be a self-contained portion of the RTL design. In some embodiments, an attribute for defining signal groups for asynchronous clock domain crossings (e.g., ASYNC_GROUP_DEFS) can be assigned to one or more modules of the RTL design. The syntax of the value of this attribute may be: group_name{timing_parameter=timing_value, . . . }, . . . . Exp 1 illustrates an example for defining two signal groups in a module of the RTL design using Very High Speed Integrated Circuit (VHSIC) hardware description language (VHDL).

ATTRIBUTE ASYNC_GROUP_DEFS OF MYMAC:
   ENTITY IS
   "GRAY{MAX_LATENCY_XMIT=1.5, MAX_
   SKEW_XMIT=1.0}, CFG {MAX_LATEN-
   CY_RCV=5.0}";                                    Exp. 1

Exp. 1 defines two signal groups GRAY and CFG for module MYMAC. The module MYMAC may be represented by the circuit 300 of FIG. 3. The signal group GRAY is associated with two timing specifications—MAX_LATENCY_XMIT=1.5 and MAX_SKEW_XMIT=1.0. Thus, for the signal group GRAY, the maximum latency for asynchronous crossings that pass through signals in this signal group is 1.5 transmit clock periods. Also, the maximum skew for asynchronous crossings that pass through signals in this signal group is 1.0 transmit clock period. The signal group CFG is associated with one timing specification—MAX_LATENCY_RCV=5.0. Thus, for the signal group CFG, the maximum latency for asynchronous crossings that pass through signals in this signal group is 5.0 receive clock periods. In some embodiments, timing specifications may be assigned to some of the timing parameters for each of the signal groups, as depicted in Exp 1. The assigned timing specifications associated with the timing parameters may be used during timing analysis. During timing analysis, default timing specifications may be used for those timing parameters that are not explicitly assigned alternate timing specifications. In other embodiments, timing specifications may be assigned to all of the timing parameters for each of the signal groups.

The signal groups may be determined based, at least in part, on the timing specifications associated with different signals communicated in the module. The number of signal groups that are defined within the module may vary depending on the number of components, the number of clock domains, and timing requirements of each signal transmitted in the module. After defining one or more signal groups for a module of the RTL design, signals that pass through asynchronous clock domain crossings may be assigned to an appropriate signal group.

In some embodiments, an attribute (e.g., ASYNC_GROUP) can be assigned to a signal in a module of the RTL design. The value of the attribute may be the name of a signal group defined by the ASYNC_GROUP_DEFS attribute for the same or a higher-level module. In other words, the value of the ASYNC_GROUP attribute assigned to a signal may be the name of the signal group to which the signal is assigned. The signals that should be assigned to each of the signal groups may be determined based on timing constraints on each of the signals and knowledge of which signals are dependent on each other. FIG. 3 further illustrates the result of assigning signals generated by components in a module to an appropriate signal group. In this example, signals GRAY0 and GRAY1 generated by flip-flops 304 and 306 are assigned to signal group GRAY. For example, a designer may have a priori knowledge that the signals GRAY0 and GRAY1 are part of a Gray-coded bus and that these signals are associated with a maximum skew of 1 transmit domain clock period. Based on this knowledge, the signals GRAY0 and GRAY1 may be assigned to a common signal group GRAY and timing specifications can be assigned to the signal group depending on the timing constraints of the signals (e.g., 1 clock period skew). Asynchronous crossings through the signals GRAY0 and GRAY1 will be timed/analyzed according to timing specifications associated with the signal group GRAY. Signal FENCE generated by the flip-flop 308 is assigned to signal group CFG. For example, a designer may have a priori knowledge that the signal FENCE is a configuration signal that transitions when the circuit is being configured (e.g., during test modes) and remains at a constant logic level during functional operation. The designer may also have a priori knowledge that the configuration signal has a long transmission delay and that the configuration signal may be received by multiple components. Based on this knowledge, the FENCE signal may be assigned to the signal group CFG (along with other similar configuration signals not shown in FIG. 4). Asynchronous crossings through the signal FENCE will be timed according to timing specifications associated with the signal group CFG. Signal GRAY1_RCV that is generated by the flip-flop 320 and provided as feedback to the flip-flop 302 does not have any attributes or explicitly listed timing specifications. Therefore, asynchronous crossings through the feedback signal GRAY1_RCV will be timed according to default timing specifications. Defining signal groups and assigning signals to the signal groups can ensure that timing analysis is performed across signals that belong to a specific signals group. For example, the skew timing parameter may be determined across signals within the GRAY signal group. In this example, the skew associated with the GRAY signal group may be determined as the difference in the arrival times between the GRAY0 signal and the GRAY1 signal at the flip-flops 318 and 320 respectively. The arrival time of the signals in the CFG signal group may not be taken into consideration when determining the skew for the GRAY signal group.

After signal groups are defined for each module of the RTL design and signals transmitted within the module are assigned to an appropriate signal group, an indication of these assignments may be stored in the signal groups structure 102 of FIG. 1. For a particular module of the RTL design, the signal groups structure 102 may include A) an indication of the signal groups for the module, B) timing parameters associated with each signal group, and/or C) signals assigned to each signal group.

The design analysis unit 104 can analyze the RTL design 110 and can identify different modules within the RTL design 110 and different instances of each module based, at least in part, on the instantiation of modules by other modules within the RTL design, typically specified by a hardware description language such as VHDL. Because timing specifications are assigned to signal groups defined within a module in the RTL design, these timing specifications are local to the module in which they are defined. In other words, the timing specifications may be local to the module that is associated with the ASYNC_GROUP_DEFS attribute. In one embodiment, the module associated with the ASYNC_GROUP attribute may be the same as the module that is associated with the ASYNC_GROUP_DEFS attribute as depicted in the Figures. However, in other embodiments, the module associated with the ASYNC_GROUP attribute may be a hierarchically lower level module as compared to the module that is associated with the ASYNC_GROUP_DEFS attribute. Although a module is designed as a standalone unit, the electronic chip may include multiple instances of the module. For example, the module may be an adder module including timing specifications assigned to one or more signals within the adder module. The electronic chip may include multiple adders that are implemented by instantiating the adder module (specified in the RTL design) multiple times. Each instance of the adder module may have different data inputs, different clock inputs, etc. In other words, the operation of a first instance of the adder module may be independent of the operation of a second instance of the adder module. Accordingly, timing analysis for the first instance of the adder module should be independent of the timing analysis for the second instance of the adder module.

Figures 4A, 4B:
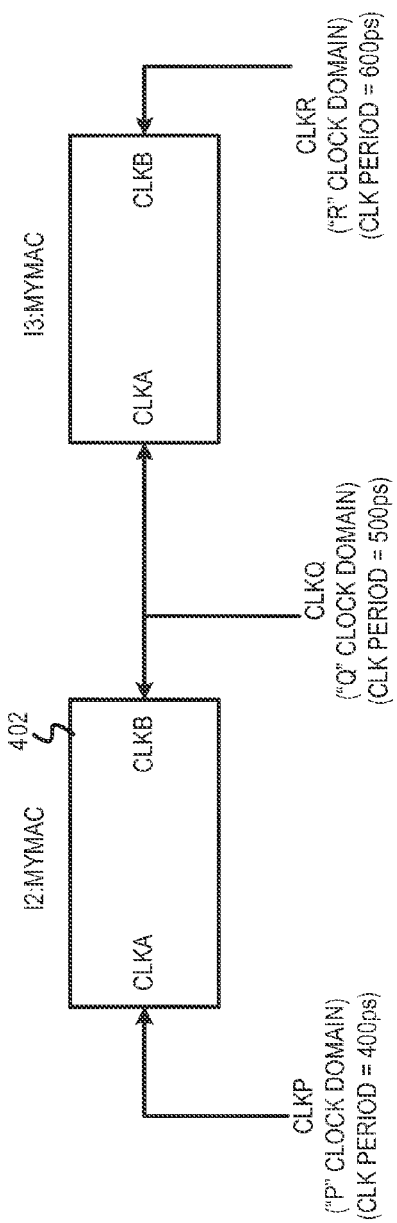
FIG. 4A illustrates an example electronic chip including multiple instances of a module with different clock inputs.
FIG. 4B illustrates an example data structure for mapping local signal group names to global signal group names.

FIG. 4A illustrates an example electronic chip including multiple instances of a module with different clock inputs. FIG. 4A is described with reference to the MYMAC module that is represented by circuit 300 of FIG. 3. In FIG. 4A, the MYMAC module is instantiated twice with different clock domains driving the clock inputs for each of the instances. In FIG. 4A, the two instances of the MYMAC module have instance names I2 and I3, and are referred to by the labels I2:MYMAC 402 and I3:MYMAC 404, respectively. For example, the label I2:MYMAC can be read "instance I2 of module MYMAC." Clocks P and Q drive the clock inputs for I2:MYMAC 402. Clocks Q and R drive the clock inputs for I3:MYMAC. In some embodiments, the clock period for clocks P, Q, and R may be 400 ps (picoseconds), 500 ps, and 600 ps respectively. In other embodiments, the clocks may have other suitable clock periods.

In some embodiments, the design analysis unit 104 may iterate over all global instances (in an elaborated design) or may perform a depth-first traversal of a hierarchical design to identify each instance of each module of the design. The design analysis unit 104 may generate a global signal group name for each instance of a module that includes an ASYNC_GROUP_DEFS attribute. The design analysis unit 104 can generate a data structure (e.g., a table) to map global module instance names and local group names to global signal group names. Thus, any signal group that is defined locally within a module (e.g., signal group GRAY locally defined within module MYMAC) will have one corresponding distinct global signal group name for each instance of the module. Also, if the same signal group name is defined in a different/unrelated module, it will also have a distinct corresponding global signal group name. Thus, the global signal group name can be selected to be unique across all instances of a module and across the entire design of the electronic chip.

FIG. 4B illustrates an example data structure for mapping local signal group names to global signal group names. In the example of FIG. 4B, the design analysis unit 104 identifies two modules in the RTL design—MYMAC and YOURMAC. Additionally, the design analysis unit 104 identifies two instances of the module MYMAC. Based on the received signal group information per module, the design analysis unit 104 determines that both modules MYMAC and YOURMAC include a signal group with the same name GRAY. The timing specifications for signal group GRAY in module MYMAC may differ from the timing specifications for signal group GRAY in module YOURMAC. In some embodiments, the design analysis unit 104 can determine the global signal group name as a combination of the module instance and the local signal group name. For example, as depicted in FIG. 4B, the signal group GRAY for the I2 instance of the MYMAC module is represented as GRAY2; while the signal group GRAY for the I3 instance of the MYMAC module is represented as GRAY3. The signal group GRAY for the YOURMAC module is represented by GRAY4M. Assigning unique global signal group names helps distinguish between groups of signals across different modules and across different instances of the same module. In other embodiments, other suitable naming conventions may be used to determine a unique global signal group name. For example, the design analysis unit 104 may append a suffix to the local group name based on the instance name.

In some embodiments, the design analysis unit 104 may also include timing specifications associated with each of the global signal groups. In FIG. 4B, the global signal groups GRAY2 and GRAY3 are different instances of the same signal group GRAY of the module MYMAC and therefore, are associated with the same set of timing specifications. Likewise, the global signal groups CFG2 and CFG3 are different instances of the same signal group CFG of the module MYMAC and therefore, are associated with the same set of timing specifications. The global signal group GRAY4M is associated with a different module YOURMAC and therefore, is associated with timing parameters that are different from those of the signal group GRAY of the module MYMAC. Assigning global group names that are unique across different instances of the module and across the physical design can minimize collision between signal groups that belong to different module instances or different modules. Assigning global group names that are unique across different instances of the module and across the physical design can ensure that timing analysis is independently performed for each signal group. In other words, the timing analysis may be performed based on arrival times of signals that belong to a common signal group within the same module instance. The arrival times of signals that belong to a different signal group within the same module instance or within another module may not be taken into consideration. It is noted that FIG. 4B does not include the minimum latency specifications for simplicity. In some embodiments, the design analysis unit 104 may only record non-zero timing specifications for each signal group in the data structure. However, in other embodiments, the design analysis unit 104 may record all the timing specifications for each signal group in the data structure. The example of FIG. 4B indicates timing specifications (e.g., maximum latency and maximum skew in transmit domain clock periods) that were defined for the GRAY signal group in Exp. 1. FIG. 4B also indicates timing specifications (e.g., maximum latency in receive domain clock periods) that were defined for the CFG signal group in Exp. 1. As depicted in FIG. 4B, default timing specifications (represented by "(DEF)" in FIG. 4B) may be employed when timing specifications for a timing parameter are not explicitly specified.

Figure 5:
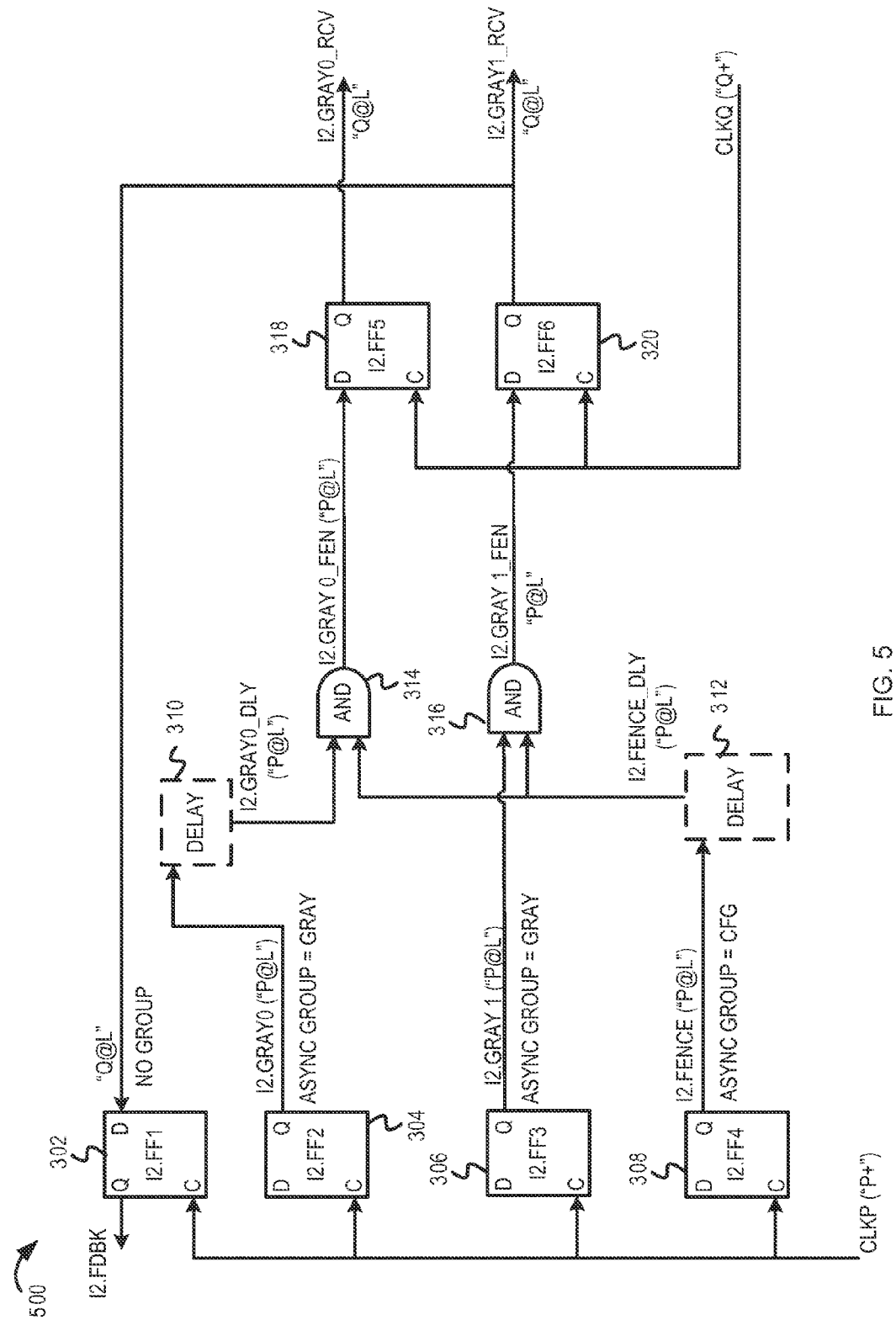
FIG. 5 illustrates an example circuit diagram including multiple clock domains and asynchronous clock domain crossings.

FIG. 5 is an example physical circuit design ("physical design") 500. The physical design 500 may be synthesized from the RTL design 300 of FIG. 3. In some embodiments, logic synthesis operations may be executed to generate the physical design from the RTL design. The logic synthesis operations may convert an abstract form of desired circuit behavior (e.g., the RTL design) to a design implementation that is specified in terms of logic gates. The physical design is typically represented by a "netlist" that describes the connectivity of different components in an electronic design. Nets can refer to wires that connect components together in the electronic design. As depicted in FIG. 5, the signal group definitions and the signals assigned to each signal group are propagated from the RTL design 300 to the physical design 500. FIG. 5 represents the physical design of one module instance in a hierarchical RTL design. In the physical design 500, each signal (or component) is associated with an identifier that indicates the hierarchical path and the instance in the RTL design 300 from which the signal (or component) originated. For example, a signal named GRAY0 in a module instance I2 of the RTL design may have the name I2.GRAY0 in the physical design. As another example, a component named FF1 in a module instance I2 of the RTL design may have the name I2.FF1 in the physical design.

The quoted strings in FIG. 5 represent markers that identify a clock domain, the type of signal (e.g., clock signal or data signal), and the clock edge at which the signal is transmitted via each net. The marker may also be referred to as a "phase tag." The phase tags may be propagated through a netlist by a static timing analysis tool (e.g., IBM's EinsTimer). A net (or signal path) may be associated with multiple phase tags if the net has multiple sources (e.g., if a combination of signals are transmitted along the signal path). The phase tag can help isolate or categorize components as belonging to a particular clock domain. Table 2 illustrates example phase tags and their corresponding meaning.

TABLE 2

| Phase Tag | Meaning |
|---|---|
| A+ | Clock signal has the same phase as virtual clock A |
| A− | Clock signal hasthe opposite phase as virtual clock A |

TABLE 2-continued

| Phase Tag | Meaning |
|---|---|
| A@L | Data signal launched at eading edge of virtual clock A |
| A@T | Data signal launched at trailing edge of vvirtual clock A |

In Table 2, the term "virtual clock" refers to an abstract source of transitions that can represent an oscillator that is internal or external to the circuit being analyzed. A virtual clock may also be called an "ideal clock." The waveform of a virtual clock, including the times of the leading (rising) and trailing (falling) edges, are established by a "clock definition" based on the intended operating frequency and phase of the oscillator. This is distinguished from a "clock signal," such as signal CLKA in FIG. 4, which can be located some distance from the oscillator, and which may be affected by delays, inverters, or other logic gates in the path between the oscillator and the clock signal. Therefore, the rise and fall times of a clock signal are determined by both the phase tag associated with the signal, and the arrival times computed by static timing analysis, which takes into account the delays in the clock path. As depicted in Table 2, phase tag "A@L" represents a data signal that is launched from a component in clock domain A at the leading (rising) edge of virtual clock A. Phase tag "A@T" represents a data signal that is launched from a component in clock domain A at the trailing (falling) edge of virtual clock A. Phase tag "A+" represents a clock signal that is a positive active clock in the clock domain A. This means that the clock signal has the same phase as virtual clock A. Phase tag "A−" represents a clock signal that is a negative active clock in the clock domain A. This means that the clock signal the opposite phase of virtual clock A. The rising edge of a negative active clock signal corresponds to the trailing (failing) edge of the virtual clock; and the falling edge of a negative active clock signal corresponds to the leading (rising) edge of the virtual clock. The terms "leading" and "trailing" are associated with a virtual clock, and each can therefore correspond to either rising or falling edges of a clock signal (e.g., CLKA), depending on the polarity (+ or −) of the phase tag. The phase tags may be propagated through the components in the RTL design as each signal passes through various components in the design.

Referring to FIG. 5, the flip-flop 304 launches the signal I2.GRAY0 at the rising edge of the clock signal CLKP. Because clock signal CLKP has phase tag "P+," the rising edge of clock signal CLKP corresponds to the leading edge of virtual clock P. Accordingly, the phase tag "P@L" is associated with the signal I2.GRAY0. The signal I2.GRAY0 undergoes processing and/or transmission delays (represented by the delay element 310) and therefore, the delayed signal I2.GRAY_DLY is also associated with the phase tag "P@L." The signal I2.FENCE undergoes processing and/or transmission delays (represented by the delay element 312) and therefore, the delayed signal I2.FENCE_DLY is also associated with the phase tag P@L. The delayed signals I2.GRAY0_DLY and I2.FENCE_DLY are provided to the AND logic gate 314. Each of these signals is associated with the phase tag "P@L" and therefore, the phase tag "P@L" is propagated to the signal at the output of the AND logic gate 314. The output of the AND logic gate 314 is provided to the input of the flip-flop 318. Therefore, the data input pin (D) of the flip-flop 318 is associated with the phase tag "P@L." However, the phase tag "Q+" is associated with the clock input pin (C) of the flip-flop 318. The clock input pin phase tag and the data input pin phase tag reference different virtual clocks. Accordingly, the signal I2.GRAY0_FEN at the input of flip-flop 318 may be identified as crossing between asynchronous clock domains. Likewise, the signal I2.GRAY1_FEN at the input of flip-flop 320 may be identified as crossing between asynchronous clock domains.

In addition to phase tags, the static timing analysis tool (e.g., the timing analysis unit 108) may also determine early arrival times (EAT) and late arrival times (LAT) for each phase tag and signal in the design. The EAT and LAT can indicate the earliest and the latest times, respectively, at which a transition can occur on the given signal. In some embodiments, the EAT and LAT of a signal may be determined for both the rising and failing edges of the signal. However, in other embodiments, the EAT and LAT may be determined (per phase tag and per signal) for the earliest or latest, respectively, of either the rising edge or the failing edge of the signal. The EAT and LAT may be propagated through the netlist by calculating the minimum and maximum delay through each component. The EAT and the LAT may be used to execute timing analysis for asynchronous clock domain crossings as will be further described below.

After the physical design has been created and before static timing analysis begins, the phase tag rename unit 106 may analyze each net in the physical design. If the net is associated with a signal group (e.g., if an ASYNC_GROUP attribute is assigned to a signal), the phase tag rename unit 106 may determine the local group name and the global instance name associated with the net. For example, the phase tag rename unit 106 may access the data structure of FIG. 4B to identify an entry with a local group name and a global instance name that match the location of the net. The global signal group name associated with the net can be determined from the matching entry. If multiple entries are identified at different levels of hierarchy, a precedence rule can be used to determine which entry of the data structure should be used. For example, if multiple entries are identified at different levels of hierarchy, the entry associated with the lowest level in the hierarchy may be selected. In some embodiments, the phase tag rename unit 106 may generate a "phase rename" command based, at least in part, on the global signal group name associated with the net. In some embodiments, the phase rename command may be provided to the timing analysis unit 108. The timing analysis unit 108 may rename an original phase tag of the signal with a new phase tag wherever the original phase tag propagates through the physical design. In other words, the timing analysis unit 108 may rename the clock portion of the phase tags that propagate to each net. In some embodiments, the timing analysis unit 108 may execute a preliminary timing analysis on the physical design to identify the phase tags and clocks that propagate to each net. The results of the preliminary timing analysis may be represented by the circuit of FIG. 5. In one embodiment, the phase rename command may include parameters such as, an identifier of the net, the original clock name, and a new clock name. In another embodiment, the phase rename command may include parameters such as, an identifier of the net, the original phase tag, and a new phase tag. The new clock name (or the new phase tag) may be determined based, at least in part, on the global signal group associated with the net. In response to receiving the phase rename command, the timing analysis unit 108 may rename each clock associated with the identified net from the original clock name (original phase tag) to the new clock name (new phase tag). However, in other embodiments, the phase tag rename unit 106 may receive results of the preliminary timing analysis from the timing analysis unit 108 and may rename the clocks (phase tags) as described above. In some embodiments, the phase tags with renamed clocks may be propagated downstream of the net through the physical design.

In the physical design, each instance of a module may be analyzed separately. Operations for renaming phase tags may be independently executed for each module and for each instance of a module. Table 3 illustrates examples for renaming a phase tag associated with signals in various instances of a module.

TABLE 3

| Global instance | Global signal group | Original clock | Renamed clock |
| --- | --- | --- | --- |
| 12 | CFG2 | P | P_CFG2 |
| 12 | GRAY2 | P | P_GRAY2 |
| 13 | CFG3 | Q | Q_CFG2 |
| 13 | GRAY3 | Q | Q_GRAY2 |

Referring to the example of Table 3, FIG. 4A, and FIG. 4B, the original clock P controls signals that are part of the I2 instance of the MYMAC module (e.g., the global signal groups GRAY2 and the CFG2). To generate distinct timing paths for independent timing analysis, the original clock P may be renamed depending on the global signal group to which the signal belongs. For example, signals that belong to the GRAY2 global signal group may be associated with a renamed clock of P_GRAY2. Likewise, signals that belong to the CFG2 global signal group may be associated with a renamed clock of P_CFG2. As another example, the original clock Q controls signals that are part of the I3 instance of the MYMAC module (e.g., the global signal groups GRAY3 and CFG3). Therefore, signals that belong to the GRAY3 global signal group may be associated with a renamed clock of Q_GRAY3. Likewise, signals that belong to the CFG3 global signal group may be associated with a renamed clock of Q_CFG3.

Figure 6:
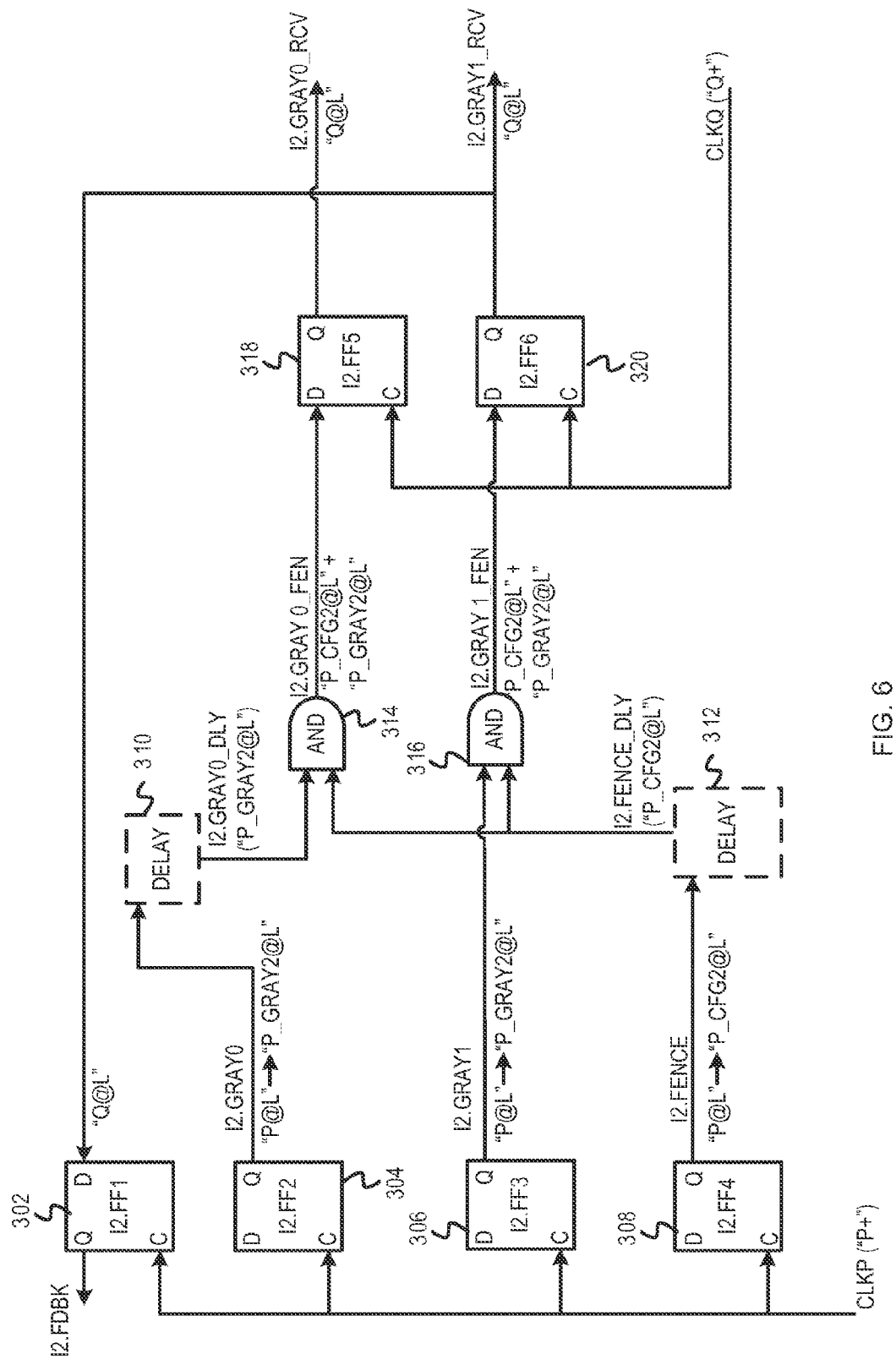
FIG. 6 illustrates an example circuit diagram of one instance of a module including results of renaming a phase tag associated with each signal in the module.

FIG. 6 illustrates an example circuit diagram of one instance of a module including results of renaming a phase tag associated with each signal in the module. Operations for renaming the phase tags will be described with reference to one instance of module MYMAC in the physical design (e.g., instance I2:MYMAC 402). In FIG. 6, the I2:MYMAC module is one instance of one module of a hierarchical RTL design. The MYMAC module has been elaborated into a non-hierarchical design and has then been processed by logic synthesis. In a flattened physical design, in which module boundaries have been removed, the phase tag rename unit 106 can identify the module instance from which a signal originated by associating the name of the signal with the name of the module instance. Therefore, in the example of FIG. 6, local signal/component names are qualified by the module instance in which they are present resulting in a qualified name that references both the signal/component and the module instance. For example, a signal named GRAY0 in a module instance I2 may have the name I2.GRAY0 in the flattened physical design. The prefix of the signal name identifies the corresponding global module instance name.

In the example of FIG. 6, the phase tag rename unit 106 determines that the signal I2.GRAY0 is associated with an ASYNC_GROUP attribute (preserved from the conversion between the RTL design and the physical design). The phase tag rename unit 106 may determine to rename the original phase tag associated with the signal I2.GRAY0 to a new phase tag. The phase to rename unit 106 may determine that signal I2.GRAY0 is part of instance I2 of the module MYMAC and that the corresponding local signal GRAY0 in module MYMAC is assigned to local signal group GRAY. The phase tag rename unit 106 may determine that the signal I2.GRAY0 matches a row in the data structure of FIG. 4B and is part of the global signal group GRAY2. Accordingly, the phase tag rename unit 106 may rename the phase tag "P@L" that controls the signal I2.GRAY0 to "P_GRAY2@L" as depicted in Table 3 and FIG. 6. The phase tag rename unit 106 can execute similar operations to rename the clock associated with the signals I2.GRAY1 and I2.FENCE to "P_GRAY2@L" and "P_CFG2@L" respectively More generally, any phase tag that propagates through a net that belongs to the global signal group GRAY2 may have a suffix "_GRAY2" appended to its clock portion. Likewise, any phase to that propagates through a net that belongs to the global signal group CFG2 may have a suffix "_CFG2" appended to its clock portion. Thus, the phase tag rename unit 106 can execute operations to rename the original phase tag that only indicated the clock domain to the new phase tag that indicates the clock domain, the signal group to which the signal belongs, and the instance of the module in which the signal group is located. The timing analysis unit 108 can propagate the new phase tags downstream through the physical design as depicted in FIG. 6. For example, the AND logic gate 314 receives two input data signals I2.GRAY0 and I2.FENCE. Each of these input data signals belongs to a different signal group and is governed by a different renamed clock. In other words, each of the input data signals provided to the AND logic gate 314 has a different phase tag after operations for renaming the phase tag are executed. Accordingly, the signal I2.GRAY0_FEN at the output of the AND logic gate 314 is associated with two phase tags—P_GRAY2@L and P_CFG2@L—referring to distinct asynchronous groups. Likewise, the signal I2.GRAY1_FEN at the output of the AND logic gate 316 is associated with two phase tags—P_GRAY2@L and P_CFG2@L—referring to distinct asynchronous groups. The timing analysis unit 108 can keep track of different arrival times for each phase tag associated with a net. For example, the timing analysis unit 108 can time the delay from flip-flop 304 to flip-flop 318 separately from the delay from flip-flop 308 to flip-flop 318. This can allow the two nets (i.e., between the flip-flops 304 and 318 and between the flip-flops 308 and 318) to have different timing specifications. Renaming the phase tags can also enable the timing analysis unit 108 to execute timing analysis operations separately on the two signal groups (e.g., to analyze arrival times of those signals that are assigned to a particular signal group).

The timing analysis unit 108 can perform timing analysis operations on those components of the physical design that receive input data signals with different phase tags. For each sequential component, such as a flip-flop, that receives input data signals with different phase tags, the timing analysis unit 108 can determine the receive domain based on the phase tags at the clock input (C). The timing analysis unit 108 can also determine the transmit domain and the global signal group name, if any, for each input data signal based on the phase tags at each data input (D). As discussed above, the timing specifications were represented in terms of the transmit domain clock period and the receive domain clock period in the RTL design and subsequently, propagated to the physical design. In the physical design, each instance of each module is governed by one or more clocks. The timing analysis unit 108 can convert the timing specifications that are represented in terms of clock periods to corresponding timing specifications that are represented in terms of absolute time units. As will be further described below, the timing specifications (in absolute time units) may be used to execute timing analysis for components that receive an input data signal associated with an asynchronous clock domain crossing (i.e., an input data signal that crosses between asynchronous clock domains).

Figure 8:
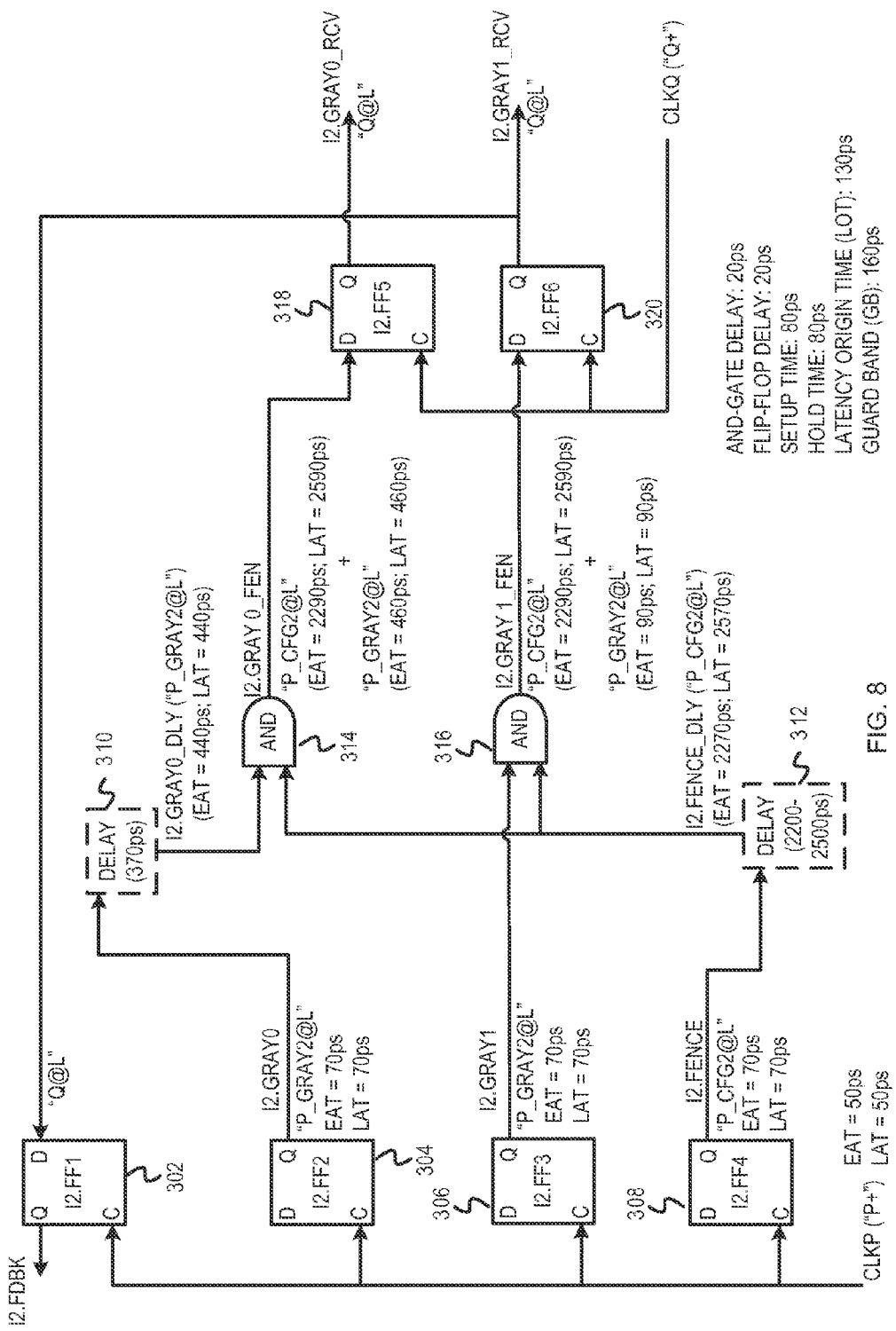
FIG. 8 is an example circuit diagram illustrating one instance of a circuit module for performing timing analysis on asynchronous clock domain crossings.

FIG. 7A is an example table 700 illustrating the timing specifications governing each asynchronous clock domain crossing from domain P to domain Q. The table 700 illustrates the timing specifications associated with the flip-flops 318 and 320 in instance I2 of the MYMAC module. FIG. 8 is an example circuit diagram illustrating one instance of a circuit module for performing timing analysis on asynchronous clock domain crossings. Operations for timing asynchronous clock domain crossings will be described with reference to one instance of module MYMAC in the physical design (e.g., instance I2:MYMAC 402). In FIG. 8, each of the flip-flops 318 and 320 (i.e., I2,FF5 and I2.FF6, respectively) receive two input data signals with different phase tags. For the flip-flops I2.FF5 and I2.FF6, the receive domain clock (clock Q at 500 ps) is determined based on the phase tags at the clock input (e.g., Q+). The phase tags associated with each input data signal received at the flip-flops 318 and 320 is determined to identify the transmit domain. Each of the flip-flops I2.FF5 and I2.FF6 receive input data signals with phase tags P_CFG2@L and P_GRAY2@L. The transmit domain clock (clock P at 500 ps) is determined based on the phase tags associated with each of the input data signals. For each input data signal, the timing analysis unit 108 can determine timing specifications based on the global signal group associated with each of the input data signals.

For a particular instance of a module, the timing analysis unit 108 can convert the timing specifications that were represented in terms of transmit/receive domain clock periods to corresponding timing parameters that are represented in terms of absolute time units (e.g., picoseconds, nanoseconds, etc.). The timing analysis unit 108 can multiply the timing parameters in terms of the transmit domain clock period by the value of transmit domain clock period. Likewise, the timing analysis unit 108 can multiply the timing parameters in terms of the receive domain clock period by the value of the receive domain clock period. Referring to table 700 of FIG. 7A, the timing analysis unit 108 may determine that the phase tag P_CFG2@L corresponds to the global signal group CFG2 and may identify timing specifications assigned to the global signal group CFG2. The maximum latency in terms of receive domain clock periods (e.g., 5.0 receive domain clock periods) may be converted to absolute time units by multiplying with the receive domain clock (e.g., 500 ps). Accordingly, the maximum latency in terms of the receive domain for the phase tag P_CFG2@L is 5.0×500 ps=2500 ps.

For each timing parameter (e.g., minimum latency, maximum latency, maximum skew, etc.), the timing analysis unit 108 can determine two timing specifications—one that is based on the transmit domain clock period and the other that is based on the receive domain clock period. For each timing parameter, the timing analysis unit 108 can select the stricter of the two timing specifications to govern the timing of the components (e.g., a latch, flip-flop, register, etc.) that belong to the global signal group. For example, the timing analysis unit 108 may determine two timing specifications for the minimum latency, the maximum latency, and the maximum skew across all the signals in the GRAY2 global signal group. For minimum latency, the timing analysis unit 108 can select the timing specification with the higher value as the target timing specification. For maximum latency and maximum skew, the timing analysis unit 108 can select the timing specification with the lower value as the target timing specification. More generally, for each timing parameter, the preferred one of the transmit domain timing specification and the receive domain timing specification may be selected as the preferred timing specification. Referring to FIG. 7A, for the phase tag P_GRAY2@L, the maximum latency in terms of the transmit domain is determined to be 600 ps; while the maximum latency in terms of the receive domain is determined to be 500 ps. In this example, the lower value (i.e., 500 ps) can be selected as the target maximum latency timing specification. It is noted that calculations for minimum latency are not depicted in FIG. 7A for simplicity. However, in other embodiments, target timing specifications may be determined for other suitable timing parameters associated with the signal groups referenced by the renamed phase tags at the asynchronous clock domain crossings. Furthermore, the values included in FIGS. 7A and 8 are examples and should not limit the scope of the disclosure. In other embodiments, transmit domain clock, the receive domain clock, and each of the timing parameters may have other suitable values.

Although FIGS. 7A and 8 depict the flip-flops I2.FF5 and I2.FF6 each receiving data signals that belong to the same signal group and each having the same transmit clock domain and receive clock domain, embodiments are not so limited. In other embodiments, each component associated with an asynchronous clock domain crossing may be associated with a different transmit domain clock, a different receive signal domain clock, may receive signals that belong to different signal groups, and/or may receive signals that do not belong to any signal groups. It is noted that the signals that do not belong to any signal group and that cross between asynchronous clock domains may be timed according to default timing specifications. In the example of FIG. 8, the signal I2.GRAY1_RCV transmitted from the flip-flop 320 to the flip-flop 302 crosses between asynchronous clock domains and is not assigned to any signal group. The signal I2.GRAY1_RCV may be timed according to default timing specifications (e.g., described in Table 1).

After determining timing specifications associated with each of the asynchronous clock domain crossings, the timing analysis unit 108 can check arrival times associated with the asynchronous clock domain crossings against the corresponding timing specifications. To ensure that the arrival times determined from the physical design (e.g., depicted in FIG. 8) comply with the corresponding target timing specifications (described with reference to FIG. 7A), the timing analysis unit 108 can determine a latency origin time (LOT), the actual minimum latency of a component, the actual maximum latency of a component, the actual maximum skew for a signal group, and the guard band. Example values for some of these additional timing parameters are provided in FIG. 8. The latency origin time (LOT) can be determined as the sum of: 1) the latest arrival time of the transmit clock at any transmit domain component (e.g., latch or flip-flop) that feeds the crossing (or crossings in a given group) and 2) the hold time of the transmit domain component (or the greatest value of the hold time of any component in the transmit domain). In FIG. 8, the latency origin time is calculated as the sum of 50 ps (the latest arrival time of the transmit clock CLKP) and 80 ps (the hold time of the transmit domain components, such as flip-flops 302-308) to equal 130 ps. A flip-flop may be designed so that the input data signal does not change too close to a clock signal transition, in order for it to be predictably sampled. Thus, referring to flip-flop 318 in FIG. 8, when the clock signal Q transitions to a high logic level, the input data signal GRAY0_DLY should be either a steady logic 0 signal or a steady logic 1 signal so that the flip-flop 318 can determine an accurate sample of the input data signal. The setup time and the hold time can each refer to a time window around the clock signal transition when the input data signal should be stable. The setup time can refer to the earliest time instant at which the input data signal should be stable before the clock signal transitions. The hold time can refer to the latest time instant at which the input data signal should be stable after the clock signal transitions. In other words, the input data signal should be stable during the time interval between the setup time and the hold time. However, at an asynchronous clock domain crossing, there is no fixed relationship between the phase of the transmit clock and the phase of the receive clock. Therefore, it is possible that a transition originating from the transmit clock domain may arrive at a flip-flop in the receive clock domain during the setup or hold time. In this case, the output of the flip-flop may be nondeterministic for some time period. The latency origin time can refer to the earliest time at or after which a round-trip path can arrive back at the transmit domain and not cause a zero-clock-period round trip. A round-trip path can refer to a path from a sequential element in the transmit clock domain, to a sequential element in the receive clock domain, and then back to a (same or different) sequential element in the transmit clock domain. Referring to the example of FIG. 8, the signal path from the flip-flop 306 to the flip-flop 320, and from the flip-flop 320 to the flip-flop 302 is a round-trip path. A zero-clock-period round trip is one in which a transition launched by a clock edge in the transmit domain propagates along a round-trip path and arrives back at a transmit domain sequential element before the end of the hold time relative to the clock edge that launched the transition. The latency origin time may be used as a reference point for latency measurements to ensure there are no zero-clock-period round trips in the electronic chip design. Alternatively, the latency origin time may be determined based on other criteria established for the circuit design.

FIG. 8 also depicts example early arrival times (EAT) and late arrival times (LAT) associated with each phase tag at each signal. For example, the timing analysis unit 108 may determine the arrival time at each component in the physical design (of FIG. 8) based, at least in part, on executing a preliminary static timing analysis on the electronic chip design. For example, the timing analysis unit 108 may determine the arrival time of each signal at each of the flip-flops 318 and 320 in the receive clock domain. In this example, the arrival times of the signals I2.GRAY0_FEN and I2.GRAY1_FEN at the flip-flops 318 and 320 respectively may be determined. By determining the early and late arrival times associated with each phase tag at each signal, timing analysis can be performed across those signals that are associated with the same phase tag (e.g., that are assigned to the same global signal group).

The actual minimum latency at a receive domain component can be determined as the difference between the early arrival time of an input data signal at the component and the latency origin time. The actual maximum latency at a receive domain component can be determined as the difference between the late arrival time of the input data signal at the component and the latency origin time. The actual maximum skew for a group of asynchronous clock domain crossings (e.g., asynchronous clock domain crossings through nets belonging to a single global signal group) can be determined as the difference between: 1) the latest late arrival time of any input data signal among all the receive domain components in the global signal group (e.g., receive domain components that have a phase tag referencing the global signal group) and 2) the earliest early arrival time of any input data signal among the same set of receive domain components. The guard band (GB) can be determined as the sum of: 1) the setup time of a receive domain component (or the highest setup time of any receive domain components in the global signal group), 2) the hold time of a receive domain component (or the highest hold time of any receive domain components in the global signal group), and 3) an additional time ("padding") to account for clock uncertainty (e.g., clock jitter, clock skew, etc.) among the receive domain components in the global signal group. In some embodiments, the additional time may also account for other sources of uncertainty. The guard band may be subtracted from the maximum latency timing specification and/or maximum skew timing specification to ensure that the maximum number of clock periods in a round-trip path (or the maximum number of clock periods between the arrival of two signals) is accurately represented by the timing specification. The guard band can account for the window of uncertainty around the nominal arrival time of the receive domain clock, during which an arriving data transition may non-deterministically be sampled, not sampled, or cause the receive domain component to become metastable. In FIG. 8, the guard band is calculated as the sum of 80 ps (the setup time) and 80 ps (the hold time), to equal 160 ps. Therefore, this example assumes zero clock uncertainty. However, this example is a simplification for purposes of illustration. A typical embodiment will compute a guard band including a non-zero amount for clock uncertainty.

FIG. 7B is a table 750 including example comparison of arrival times against corresponding timing specifications for each component in an asynchronous clock domain crossing. After determining the target timing specifications for each of the components in an asynchronous clock domain crossing (see FIG. 7A), the timing analysis unit 108 can determine additional timing parameters such as latency origin time (LOT), and the guard band (GB) to check the components against their respective timing specifications. The timing analysis unit 108 may also determine actual timing characteristics, such as the actual minimum latency of a component, the actual maximum latency of a component, the actual maximum skew for a signal group. FIG. 7B depicts example values of the actual minimum latency, the actual maximum latency, and the actual maximum skew for each component in the asynchronous clock domain crossing (i.e., each signal that traverses the asynchronous clock domain crossing). In this example, the actual minimum latency, the actual maximum latency, and the actual maximum skew are determined for signals received by the flip-flops 318 and 320 (i.e., I2.FF5 and I2.FF6) in instance I2 of the MYMAC module. The actual minimum latency, the actual maximum latency, and the actual maximum skew may be determined based, at least in part, on the arrival times of the signals (or group of signals that belong to the same signal group) that traverse the asynchronous clock domain crossing. Example arrival times, component delay values, setup/hold time, latency origin time, and guard band time interval are also depicted in FIG. 8.

For each component that receives an input data signal that traversed an asynchronous clock domain crossing (e.g., flip-flops I2.FF5 and I2.FF6), the timing analysis unit 108 can compare the actual timing characteristics against the corresponding target timing specification. In some embodiments, the target timing specification for the maximum latency and the maximum skew timing parameters may be further updated to account for the guard band. Based on the comparison, the timing analysis unit 108 can determine whether each target timing specification is satisfied or violated. The target timing specification for the minimum latency may be violated if the target timing specification is greater than the actual minimum latency of a component. The target timing specification for the maximum latency may be violated if the target timing specification, minus the guard band, is less than the actual maximum latency of a component. The target timing specification for the maximum skew may be violated if the target timing specification, minus the guard band, is less than the actual maximum skew of a component. In the example of FIG. 7B, the target timing specification for the maximum latency parameter and the CFG2 signal group (minus the guard band) is 2340 ps, which is less than the actual maximum latency of 2460 ps of the flip-flop I2.FF5 for the CFG2 signal group. This indicates a timing violation associated with the flip-flop I2.FF5 for the CFG2 signal group (e.g., the signal path between the flip-flops 308 and 318).

The timing analysis unit 108 can generate a notification (e.g., in an audio, text, image, or other suitable format) to notify a circuit designer of a timing violation in the physical design. The designer can leverage the data generated after timing analysis (e.g., in FIG. 7B) to update the physical design to meet target timing specifications. Alternatively, a synthesis tool may constrain the physical design to meet the target timing specifications. The physical design may be updated (e.g., by re-routing signals, varying the length of a signal path, changing the drive strength of a component, etc.) to ensure that the signals arrive at their respective destination component in accordance with the target timing specifications.

Figure 9:
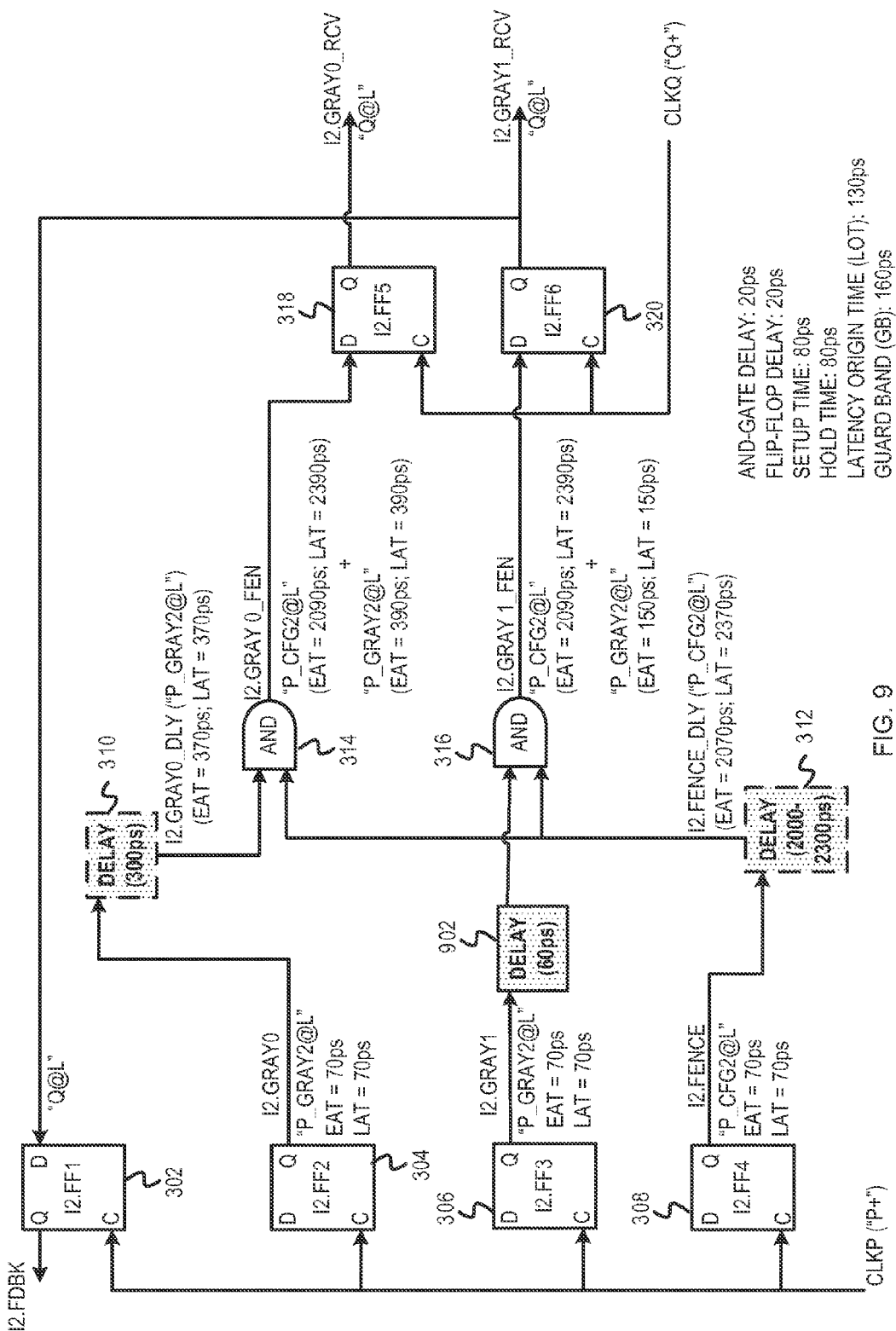
FIG. 9 is an example of an updated circuit design where signal path delays have been adjusted to meet timing requirements.

FIG. 9 is an example of an updated circuit design where signal path delays have been adjusted to meet timing requirements. Comparing the original physical design of FIG. 8 with the updated physical design of FIG. 9, the updated elements are represented by dotted blocks. In FIG. 9, a 60 ps delay element 902 is added to the signal path between the flip-flops 306 and 320 to exceed the minimum latency requirement (e.g., by 20 ps) and avoid a potential zero-cycle round trip from flip-flop 306 to flip-flop 302 via flip-flop 320. Additionally, the delay introduced by processing and/or transmission delays (e.g., represented by the delay element 310) in the signal path between the flip-flops 304 and 318 is reduced from 370 ps to 300 ps. This, in combination with the delay element 902, can reduce the skew between the flip-flops 318 and 320 to one transmit domain clock period (minus the guard band) as is specified for the GRAY signal group. Additionally, the delay introduced by processing and/or transmission delays (e.g., represented by the delay element 312) in the I2.FENCE signal path is reduced to meet the maximum latency for the CFG signal group. Executing the timing analysis as previously described with reference to FIG. 7B may indicate that there are no violations in the updated circuit design of FIG. 9.

Figure 10:
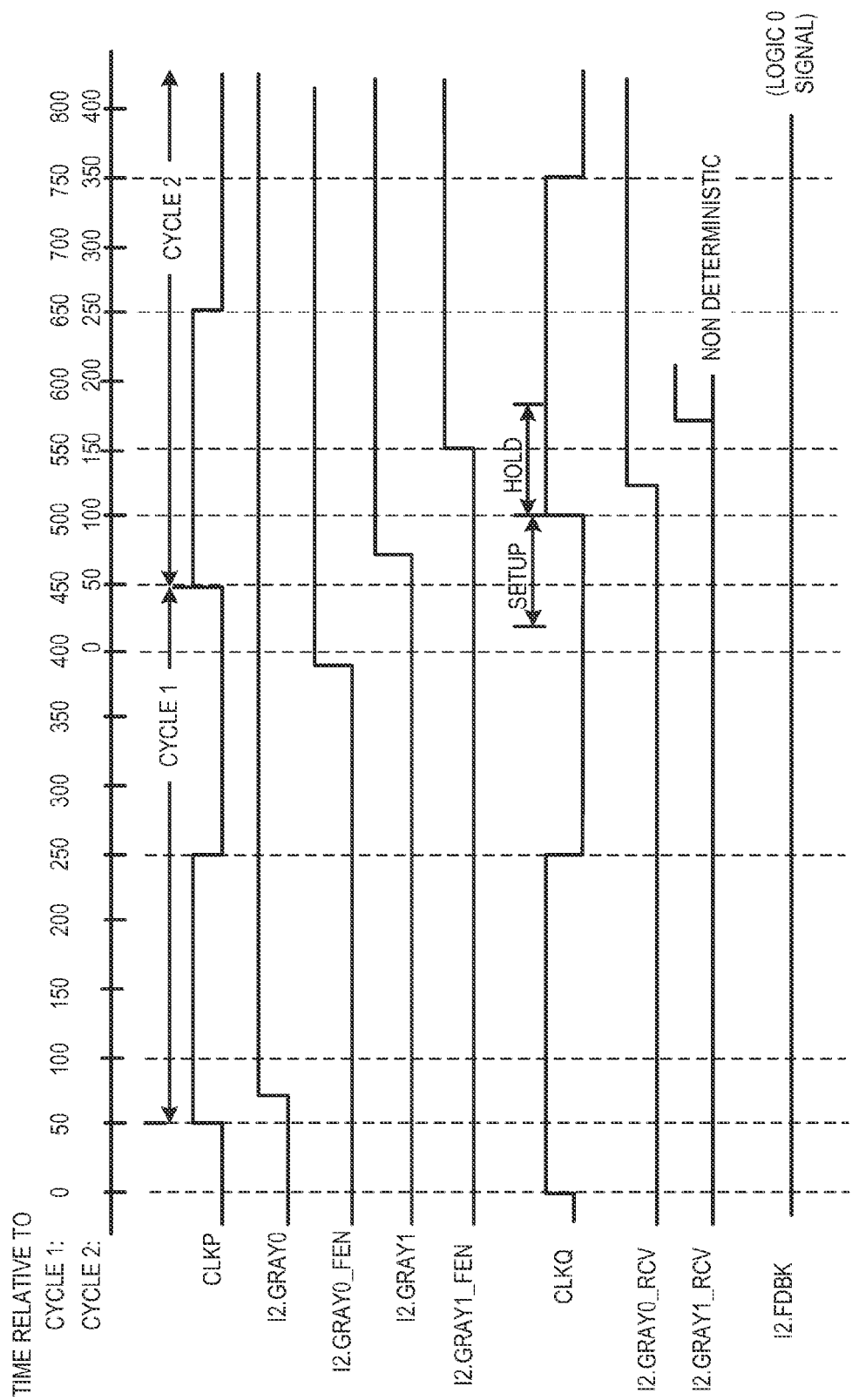
FIG. 10 is an example timing diagram illustrating signal transitions for each signal in the updated circuit design of FIG. 9.

FIG. 10 is an example timing diagram illustrating signal transitions for each signal in the updated circuit design of FIG. 9. In FIG. 10, signal I2.GRAY1_FEN transitions at time 150 ps relative to cycle 2 of transmit domain clock P, which is 20 ps after the end of the hold time associated with cycle 2 of transmit domain clock P. The hold time ends at time 130 ps, which is the rise time of CLKP (50 ps) plus the hold time of 80 ps. This indicates that the probability of a zero-cycle round trip (from flip-flop 306, through flip-flop 320, to flip-flop 302) has been eliminated. Accordingly, signal I2.FDBK is constant low. Signal I2.GRAY1_FEN transitions at time 550 ps (relative to cycle 1 of transmit domain clock P), which is 30 ps before the end of the hold time associated with receive domain clock Q. The hold time ends at time 580 ps, which is the rise time of CLKQ (500 ps) plus the hold time of 80 ps. This results in a hold time violation. Therefore, there is a possibility that flip-flop 320 (I2.FF6) will become metastable and cause signal I2.GRAY1_RCV at the output of flip-flop 320 to become nondeterministic at the next clock period. However, signals I2.GRAY0_FEN and I2.GRAY1_FEN satisfy the maximum skew requirement. In other words, if signal I2.GRAY1_FEN transitions at time 550 ps, then signal I2.GRAY0_FEN should transition no later than time 390 ps in the previous cycle, as depicted in FIG. 10. In this example, the latest transition time (e.g., 390 ps) for the signal I2.GRAY0_FEN is 30 ps before the beginning of the setup time associated with the receive domain clock Q. The setup time begins at time 420 ps, which is the rise time of CLKQ (500 ps) minus the setup time of 80 ps. This eliminates the possibility of having two consecutive transitions in a Gray-coded bus (e.g., signals I2.GRAY0_FEN and I2.GRAY1_FEN) that both violate the setup/hold time of the subsequent receive domain clock edge. In other words, components in the receive clock domain (e.g., flip-flops 318 and 320) will not sample a bus value that was not transmitted from the transmit clock domain.

In the example of FIG. 10, the signal I2.GRAY0_RCV deterministically transitions to one; but the signal I2.GRAY1_RCV is non-deterministic. Therefore, flip-flops 318 and 320 may collectively sample either a "10" or a "11" bus value, because of the nondeterministic nature of the signal I2.GRAY1_RCV. Either value is acceptable, because both were transmitted by the transmit domain (e.g., value "10" was transmitted in cycle 1 and value "11" was transmitted in cycle 2.) However, if clock Q had transitioned 30 ps earlier than is depicted in FIG. 10, then the two transitions of I2.GRAY0_FEN and I2.GRAY1_FEN would exactly straddle the setup/hold time window of clock Q, causing the flip-flops 318 and 320 to deterministically sample a "10" bus value. In the example of FIG. 8, in which the maximum skew requirement of the Gray-coded bus was violated, it would be possible for flip-flops 318 and 320 to sample a spurious value of "01" which was never transmitted by the transmit domain.

Figure 11:
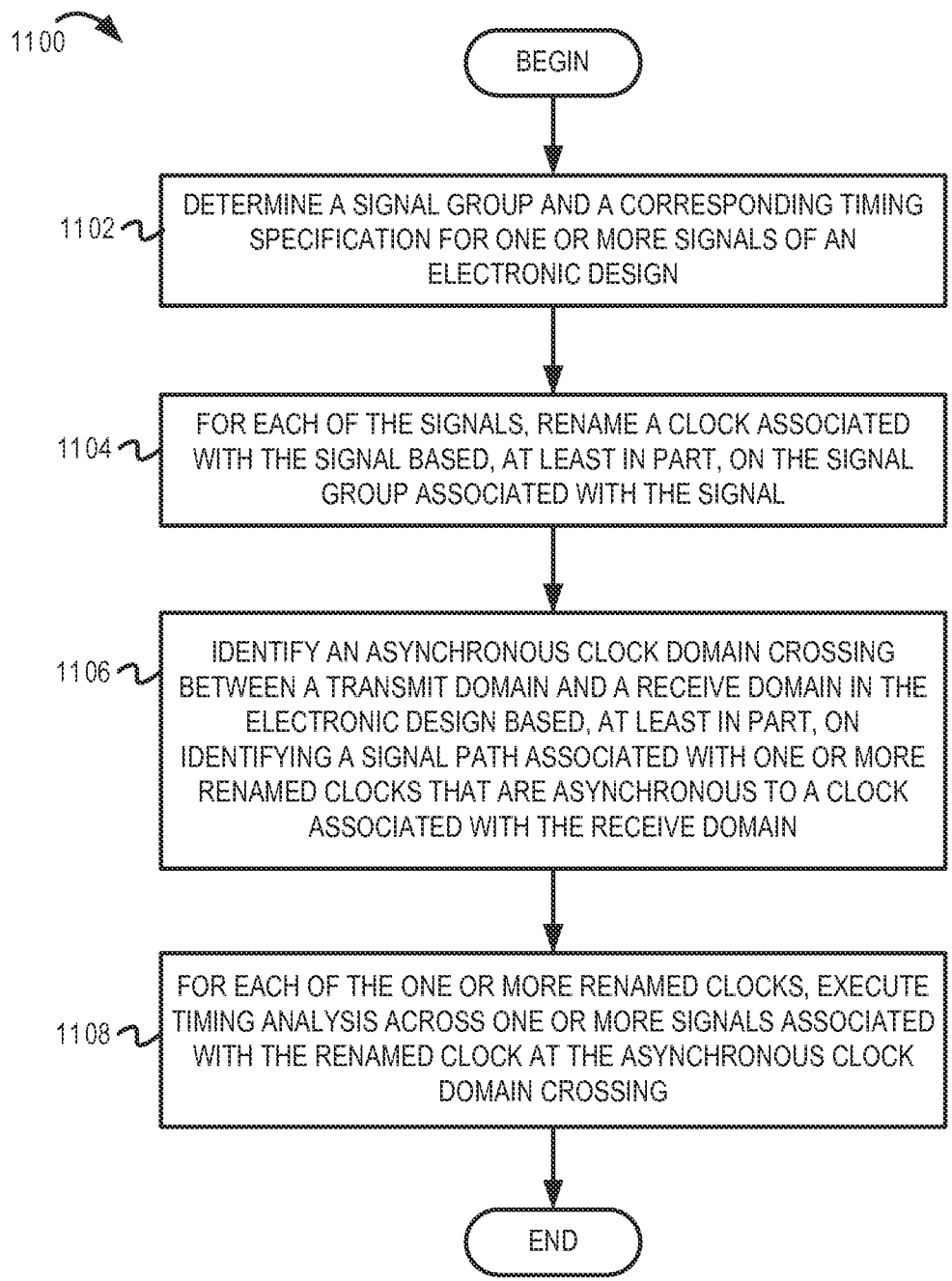
FIG. 11 is a flow diagram illustrating example operations for timing analysis of asynchronous clock domain crossings.

FIG. 11 is a flow diagram ("flow") 1100 illustrating example operations for timing analysis of asynchronous clock domain crossings. The flow 1100 begins at block 1102.

A signal group and a corresponding timing specification are determined for one or more signals of an electronic design (block 1102). Each signal group can be associated with independent clock-period-based timing specifications. Furthermore, one or more signals may be assigned to each of the signal groups based, at least in part, on timing specifications associated with the signals and the signal groups. By classifying signals into signal groups based on their timing specifications, each group of signals can be evaluated independently of the other signal groups. For example, timing analysis may be performed using arrival times of the signals that belong to a first signal group and corresponding timing specifications associated with the first signal group. The arrival times of signals that belong to a second signal group may not be taken into consideration when performing timing analysis on the signals that belong to the first signal group. The flow continues at block 1104.

For each of the signals, a clock associated with the signal is renamed based, at least in part, on the signal group associated with the signal (block 1104). The clock associated with each signal in the module (or instance of the module) may be renamed to reference the clock, the signal group to which the signal is assigned, and the module instance to which the signal belongs as described above with reference to FIG. 6 and Table 3. Renaming the clock associated with each signal can help generate independent signal paths for timing asynchronous clock domain crossings. The flow continues at block 1106.

The asynchronous clock domain crossing between a transmit domain and a receive domain is identified in the electronic design based, at least in part, on identifying a signal path associated with one or more renamed clocks that are asynchronous to a clock associated with the receive domain (block 1106). As described above, an asynchronous clock domain crossing may be identified at a sequential component (e.g., a flip-flop or latch) of the receive clock domain, where the data input and clock input of the sequential component are driven by different asynchronous clocks. The data input may include one or more renamed clocks controlling a single signal path. In other words, an asynchronous clock domain crossing may be identified by the presence of a phase tag on the data pin of a receive sequential component referring to a clock (or a renamed clock) which is asynchronous to the clock referenced by the phase tag on the clock pin. Referring to the example of FIG. 8, the clock input of the flip-flop 318 is controlled by clock CLKQ, while the data input of the flip-flop 318 is controlled by renamed clocks P_CFG2 and P_GRAY2. Thus, the signal path between the flip-flops 304 and 318 and between the flip-flops 308 and 318 may each be referred to as asynchronous clock domain crossings. Because the renamed clocks now refer to signal groups (e.g., each having different timing specifications), an asynchronous clock domain crossing that is associated with two or more renamed clocks (or with both a renamed clock and a non-renamed clock) may be analyzed separately for each of the renamed or non-renamed clocks and consequently each set of timing specifications. Specifically, signals that traverse an asynchronous clock domain crossing and that are associated with a renamed clock (e.g., the signal I2.FENCE from the flip-flop 308 to the flip-flop 320 in FIG. 8) may be analyzed according to timing specifications assigned to the signal group (e.g., the CFG2 signal group) that corresponds to the renamed clock. Signals that traverse an asynchronous clock domain crossing and that are associated with a non-renamed clock (e.g., the signal I2.GRAY1_RCV from the flip-flop 320 to the flip-flop 302 in FIG. 8) may be analyzed according to default timing specifications. This allows one or more signals to be analyzed according to unique (non-default) timing specifications. The flow continues at block 1108.

For each of the one or more renamed clocks, timing analysis is executed across one or more signals associated with the renamed clock at the asynchronous clock domain crossing (block 1108). A global signal group that corresponds to each renamed clock may be determined. For each of the renamed clocks, target timing specifications for the signal group that correspond to the renamed clock may be determined. Actual timing characteristics may be determined for each signal that traverses the asynchronous clock domain crossing based, at least in part, on arrival times associated with the signal at each component in the receive clock domain. The actual timing characteristics may be compared against corresponding target timing specifications for each signal group to determine whether the actual timing characteristics are in accordance with the target timing specifications. A notification may be generated if the actual timing characteristics are not in accordance with the corresponding target timing specifications (as depicted in FIGS. 7B and 8). One or more portions of the electronic design may be updated to ensure that the arrival times are in accordance with the target timing specifications. From block 1108, the flow ends.

Figure 12:
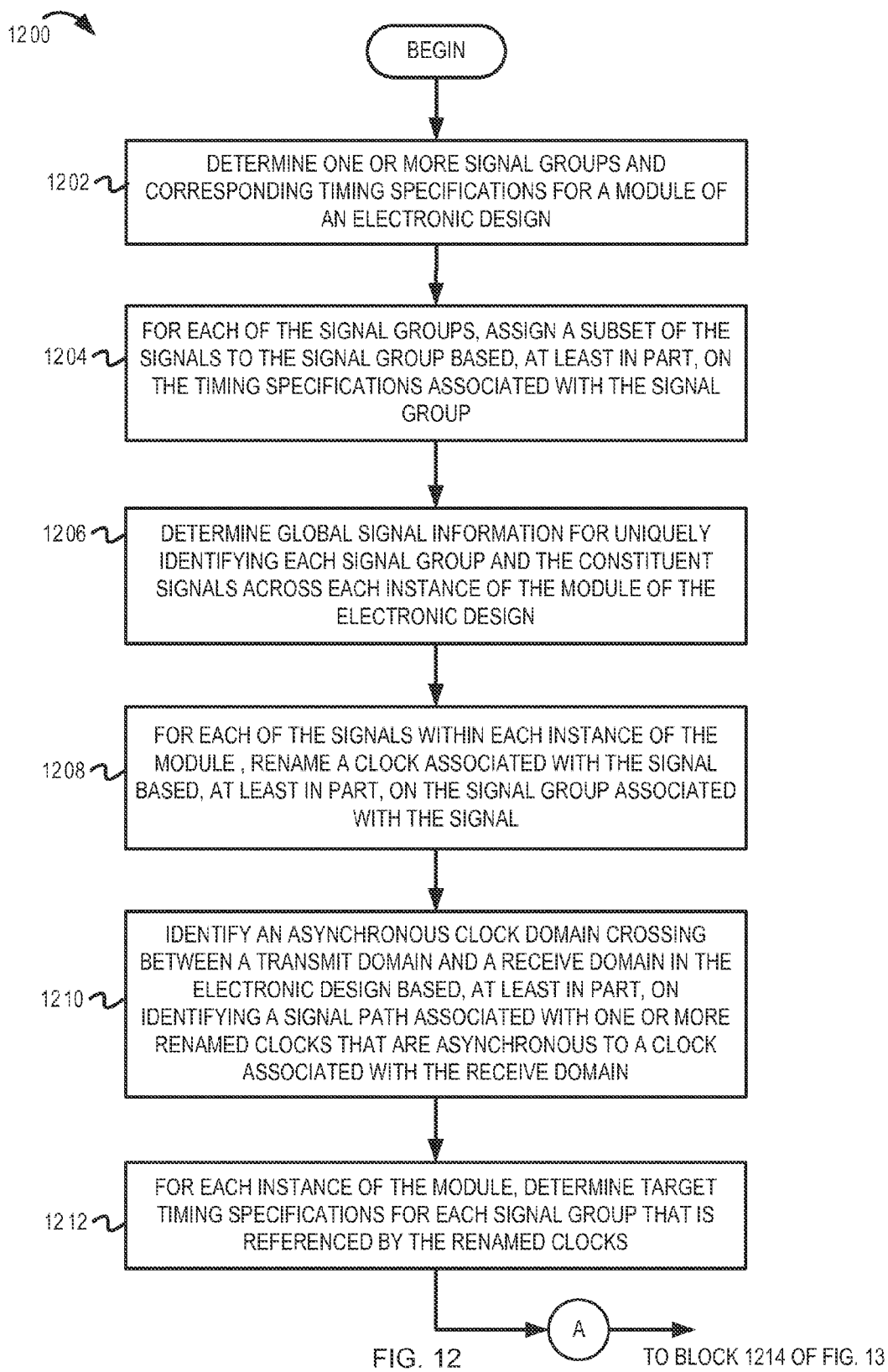
FIGS. 12 and 13 are a flow diagram illustrating example operations for grouping signals for timing asynchronous clock domain crossings.
Figure 13:
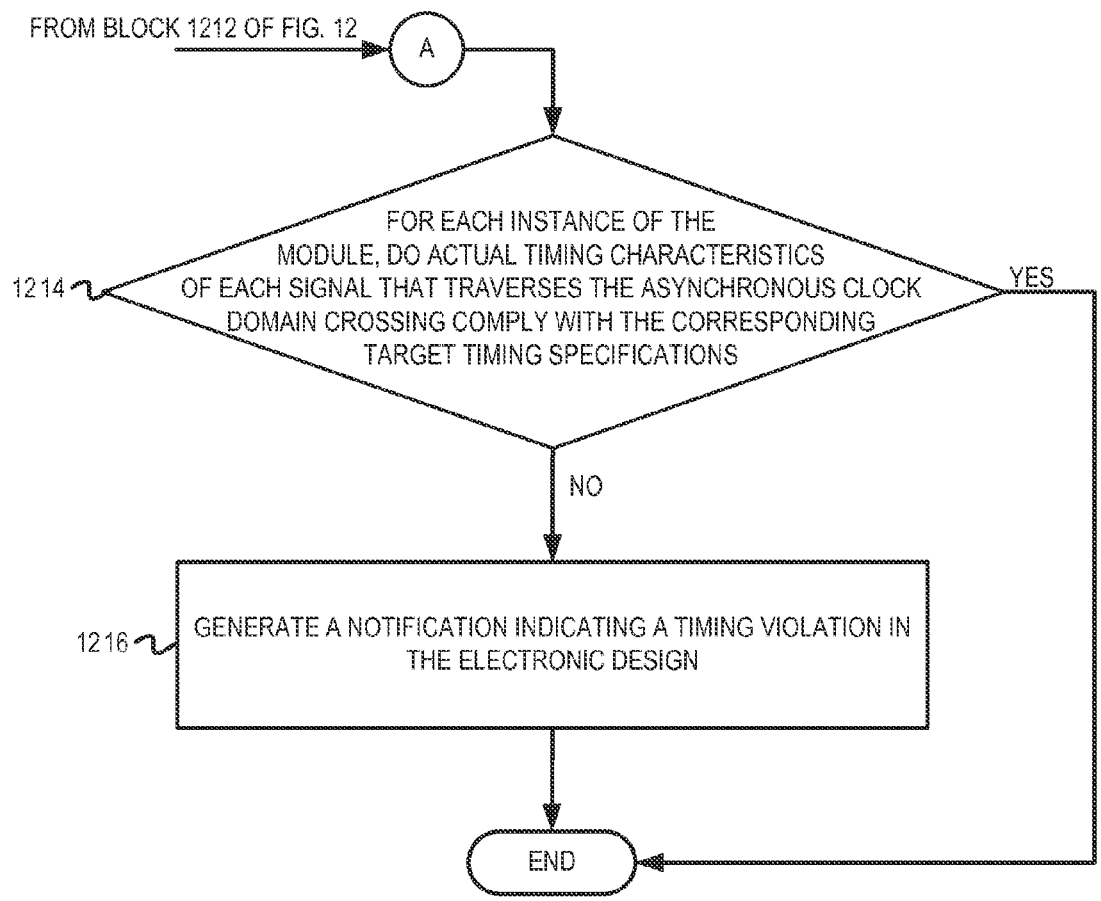

FIG. 12 is a flow diagram 1200 illustrating example operations for grouping signals for timing asynchronous clock domain crossings. The flow 1200 begins at block 1202.

One or more signal groups and corresponding timing specifications are determined for a module of an electronic design (block 1202). Each signal group can be associated with independent clock-period-based timing specifications for timing parameters. In some embodiments, an RTL design may be updated to indicate the signal groups associated with each module of the RTL design and to indicate the timing specifications associated with each signal group. The flow continues at block 1204.

For each of the signal groups, a subset of the signals is assigned to the signal group based, at least in part, on the timing specifications associated with the signal group (block 1204). One or more signals may be assigned to each signal group based on timing constraints associated with the signal and the timing specifications associated with the signal group. Referring to the example of FIG. 3, the signal group GRAY may be associated with a maximum skew of 1 transmit clock period. The signals GRAY0 and GRAY1 may be part of a Gray-coded bus. The timing constraints associated with these signals may indicate that difference between the arrival times of the signals should not exceed 1 transmit clock period. Accordingly, the signals GRAY0 and GRAY1 may be assigned to the signal group GRAY. In some embodiments, the RTL design may also be updated to indicate the signals assigned to each signal group defined for a module of the RTL design. Indicating timing specifications for groups of signals in the RTL design can enable the RTL design to independently drive both a timing analysis process and a design verification process, ensuring consistency between the processes when the design includes asynchronous clock domain crossings. The flow continues at block 1206.

Global signal information is determined for uniquely identifying each signal group and the constituent signals across each instance of the module of the electronic design (block 1206). In some embodiments, the electronic design may include multiple modules and/or multiple instances of a particular module. Determining the global signal information can include assigning a unique global signal group name to each signal group in each module or module instance of the electronic design. For example, referring to FIG. 4A, it may be determined (e.g., based on analyzing the RTL design) that the electronic design includes two instances I2 and I3 of the same module. The signals groups associated with each instance of the module may be updated to distinguish the signals groups in the I2 instance of the module from the signals groups in the I3 instance of the module. The global signal information can help uniquely identify signals across different modules and across multiple instances of the same module. The flow continues at block 1208.

For each of the signals within each instance of the module of the electronic design, a clock associated with the signal is renamed based, at least in part, on the signal group associated with the signal (block 1208). The clock associated with each signal in the module (or instance of the module) may be renamed to reference the clock, the signal group to which the signal is assigned, and the module instance to which the signal belongs as described above with reference to FIG. 6 and Table 3. Renaming clocks that govern each signal group can allow for independent timing analysis of each signal group across different modules and across multiple instances of the same module. The flow continues at block 1210.

For each instance of the module, an asynchronous clock domain crossing between a transmit domain and a receive domain is identified as a signal path associated with one or more renamed clocks that are asynchronous to a clock associated with the receive domain (block 1210). As described above, an asynchronous clock domain crossing may be identified at a sequential component (e.g., a flip-flop or latch) of the receive clock domain, where the data input and clock input of the sequential component are driven by different asynchronous clocks. The data input may include one or more renamed clocks controlling a single signal path. Referring to the example of FIG. 8, the flip-flop 318 receives an input data signal that is associated with two renamed phase tags P_GRAY2@L and P_CFG2@L that reference renamed clocks P_GRAY2 and P_CFG2 respectively. Flip-flop 318 also receives an input clock signal that is associated with phase tag Q+ that references clock Q. In this example, clock P (and consequently renamed clocks P_GRAY2 and P_CFG2) is asynchronous to clock Q, thus indicating the presence of an asynchronous clock domain crossing. The flow continues at block 1212.

For each instance of the module, target timing specifications are determined for each signal group that is referenced by the renamed clocks of the asynchronous clock domain crossing (block 1212). In the above example, target timing specifications associated with the GRAY2 and CFG2 global signal groups are determined. For each signal group, the target timing specifications may be determined based, at least in part, on the timing specifications associated with the corresponding signal group in the RTL design, a transmit domain clock period, and a receive domain clock period as described with reference to FIG. 7A. The flow continues at block 1214.

For each instance of the module, it is determined whether the actual timing characteristics of each signal that traverses the asynchronous clock domain crossing complies with the corresponding target timing specifications (block 1214). For example, arrival times of each signal that traverses the asynchronous clock domain crossing may be determined. As depicted in FIG. 7B, the actual timing characteristics (e.g., actual minimum latency, actual maximum latency, and actual maximum skew) for each signal may be determined from the arrival times of the signal or group of signals that belong to the same signal group. The actual timing characteristics may be compared against the target timing specifications to determine whether the actual timing characteristics comply with the target timing specifications. If the actual timing characteristics comply with the target timing specifications, the timing analysis of the electronic design is deemed successful and the flow ends. If the actual timing characteristics do not comply with the target timing specifications, the flow continues at block 1216.

A notification indicating a timing violation in the electronic design is generated (block 1216). Subsequently, one or more portions of the electronic design may be updated to ensure that the actual timing characteristics associated with the updated electronic design comply with the target timing specification as described with reference to FIGS. 9 and 10. From block 1216, the flow ends.

It should be understood that FIGS. 1-13 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Although examples describe leading edge data signals (depicted by phase tags ending in "@L"), embodiments are not so limited. In other embodiments, the operations described above may be equivalently applied to trailing edge data signals (e.g., represented by phase tags ending in "@T"), a combination of leading edge data signals and trailing edge data signals, etc. Furthermore, in other embodiments, other suitable phase tags may be used to represent the leading edge data signals and/or the trailing edge data signals.

As discussed above, logic synthesis may be executed to generate the physical design from the RTL design. In some embodiments, the signal groups, the timing specifications assigned to each signal group (e.g., the ASYNC_GROUP attributes), and the signals assigned to each signal group in the RTL design may be preserved across logic synthesis. This can ensure that corresponding signals in the physical design have the same signal group definitions and timing specifications as those indicated in the RTL design. In some embodiments, logic synthesis may optimize the RTL design—for example, by replacing one set of logic gates that perform a particular function with a different set of logic gates that perform the same function. This optimization may change the type of signals generated in the resultant physical design and may cause duplication or elimination of signals. The optimization may result in timing specifications and signal group definitions not being propagated from the RTL design to the physical design. Accordingly, in some embodiments, logic synthesis may be modified to not optimize at least a portion of the module that includes asynchronous clock domain crossings.

In some embodiments, the operations for timing asynchronous clock domain crossings may be executed in conjunction with a verification process. The verification process may model the circuit design and use the timing of asynchronous crossings to validate the function of the circuit design. As described above, the signal groups, the signals assigned to each signal group, and the timing specifications associated with each signal group are indicated as part of the RTL design. Because the verification process typically employs the RTL design to verify the function of the circuit design, the signal groups, the signals assigned to each signal group, and the timing specifications associated with each signal group may also be available to the verification process. The verification process can model the circuit design and verify the operation of the circuit design using the same timing parameters that were used during timing analysis. This can ensure consistency between the timing analysis process and the verification process when the design includes asynchronous clock domain crossings.

Although embodiments refer to performing timing analysis (e.g., comparing actual timing characteristics against target timing specifications) on signals that are associated with renamed clock(s) and that traverse asynchronous clock domain crossings, embodiments are not so limited. In other embodiments, a signal that traverses an asynchronous clock domain crossing may not be associated with any renamed clocks. In this embodiment, timing analysis may be performed on such signals using default timing specifications. Referring to the example of FIG. 8, flip-flop 302 (in the receive domain controlled by clock P) receives a feedback signal from flip-flop 320 (in the transmit domain controlled by clock Q). The feedback signal is not assigned to any signal group with unique timing specifications. The clock signal associated with the feedback signal may not be renamed. Accordingly, the asynchronous clock domain crossing between the flip-flop 310 and the flip-flop 302 may be analyzed using default timing specifications.

As will be appreciated by one skilled in the art, aspects of the present inventive subject matter may be embodied as a system, method, and/or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in a computer readable storage medium (or media) having computer readable program instructions embodied thereon. Furthermore, aspects of the present inventive subject matter may be a system, a method, and/or a computer program product. The computer program product may include a computer readable storage medium (or media) having computer readable program instructions thereon for causing a processor to carry out aspects of the present inventive subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
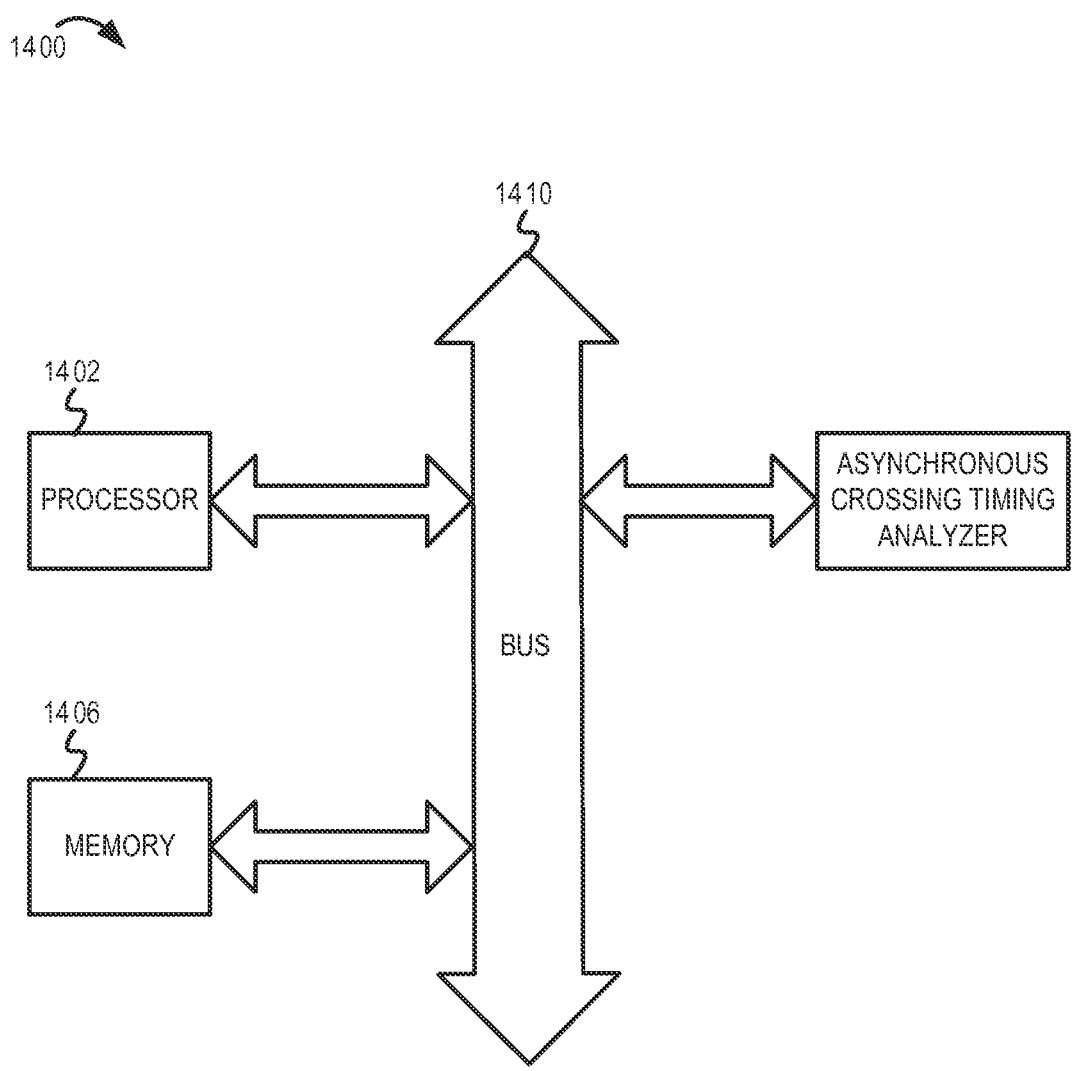
FIG. 14 is a system diagram of an example electronic device including a mechanism for timing asynchronous clock domain crossings according to an embodiment of the disclosure.

FIG. 14 depicts an example electronic device 1400 including a mechanism for timing asynchronous clock domain crossings according to an embodiment of the disclosure. The electronic device 1400 includes a processor 1402 (possibly including multiple processors, multiple cores, multiple nodes, and/or implementing multi-threading, etc.). The electronic device 1400 includes memory 1406. The memory 1406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1400 also includes a bus 1410 (e.g., PCI, ISA, PCI-Express, Hyper-Transport®, InfiniBand®, NuBus, etc.), a network interface (e.g., an ATM interface, an Ethernet interface, a Frame Relay interface, SONET interface, wireless interface, etc.) (not depicted), and a storage device(s) (e.g., optical storage, magnetic storage, etc.) (not depicted). The processor 1402, the memory 1406, and the network interfaces may be coupled to the bus 1410.

The electronic device 1400 also includes an asynchronous crossing timing analyzer 1404. The asynchronous crossing timing analyzer 1404 can implement functionality for timing asynchronous clock domain crossings as described above with reference to FIGS. 1-13. The asynchronous crossing timing analyzer 1404 can be implemented in any combination of software, hardware, or both. Any one of these functionalities may be partially (or entirely) implemented in hardware and/or on the processor 1402. For example, the functionality may be implemented with a system-on-a-chip (SoC), an application specific integrated circuit (ASIC), in logic implemented in the processor 1402, in a co-processor on a peripheral device or card, etc. Further, realizations may include fewer or additional components not illustrated in FIG. 14 (e.g., video cards, audio cards, additional network interfaces, peripheral devices, etc.). For example, in addition to the processor 1402 coupled with the bus 1410, the communication module 708 may comprise at least one additional processor. Although illustrated as being coupled to the bus 1410, the memory 1406 may be coupled to the processor 1402. In some embodiments, the memory 1406 may implement functionality to implement the embodiments described above. The memory 1406 may include one or more functionalities that facilitate implementation of operations for timing an asynchronous clock domain crossing.

While the embodiments are described with reference to various implementations and exploitations, it will be understood that these embodiments are illustrative and that the scope of the inventive subject matter is not limited to them. In general, techniques for timing asynchronous clock domain crossings as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for executing a timing analysis of an asynchronous clock domain crossing associated with physical circuit components, said method comprising:
    determining a signal group and a corresponding timing specification associated with one or more signal representations of an electronic design;
    for each of the signal representations, renaming a clock representation associated with the signal representation based, at least in part, on the signal group associated with the signal representation;
    identifying the asynchronous clock domain crossing between a transmit domain and a receive domain in the electronic design based, at least in part, on one or more of the renamed clock representations being associated with a signal path in the electronic design, wherein the one or more renamed clock representations are asynchronous to a clock associated with the receive domain;
    for each of the one or more renamed clock representations associated with the asynchronous clock domain crossing, executing the timing analysis across one or more signal representations that are associated with the renamed clock representation and that are indicated as crossing between asynchronous clock domains; and
    positioning, via circuit formation machinery, the physical circuit components on an electronic chip based on the timing analysis.

2. The method of claim 1, wherein said renaming the clock representation associated with each of the signal representations comprises:
    for a first instance of a design module of the electronic design, determining a new clock name for the clock representation associated with a first signal representation based, at least in part, on an original clock name of the clock representation, the signal group associated with the first signal representation, and an identifier of the first instance of the design module; and
    replacing the original clock name by associating the new clock name with the first signal representation.

3. The method of claim 1, wherein said executing the timing analysis comprises:
    identifying a first subset of the signal representations that are associated with a first signal group;
    determining an arrival time associated with each signal representation of the first subset of the signal representations;
    for each signal representation of the first subset of the signal representations, determining an actual timing characteristic for the signal representation based, at least in part, on the arrival time; and
    for each signal representation of the first subset of the signal representations, determining whether the actual timing characteristic is in accordance with a target timing specification associated with the first signal group.

4. The method of claim 3, further comprising:
    determining a first timing specification associated with the first signal group based, at least in part, on a transmit domain clock period associated with the asynchronous clock domain crossing;
    determining a second timing specification associated with the first signal group based, at least in part, on a receive domain clock period associated with the asynchronous clock domain crossing; and
    selecting the target timing specification associated with the first signal group as a preferred one of the first timing specification and the second timing specification.

5. The method of claim 1, wherein when the asynchronous clock domain crossing is associated with a first renamed clock representation and a second renamed clock representation,
    the first renamed clock representation indicates a first signal group that comprises a first signal representation, and the second renamed clock representation indicates a second signal group that comprises a second signal representation.

6. The method of claim 5, wherein said executing timing analysis comprises:
executing the timing analysis across a first subset of the signal representations based, at least in part, on a first timing specification associated with the first signal group; and
executing the timing analysis across a second subset of the signal representations based, at least in part, on a second timing specification associated with the second signal group.

7. The method of claim 1, wherein the signal group and the corresponding timing specification associated with each of the signal representations are indicated in a register transfer level (RTL) design.

8. The method of claim 7, wherein for each signal group, the timing specification is indicated in terms of at least one of a transmit domain clock period and a receive domain clock period, wherein the asynchronous clock domain crossing is between a first component in a transmit clock domain and a second component in a second clock domain.

9. The method of claim 1, further comprising:
propagating signal information associated with each of the signal representations from an RTL design to a physical design during a conversion of the RTL design to the physical design, wherein the signal information includes the signal group and the corresponding timing specification associated with each of the signal representations.

10. The method of claim 1, further comprising:
analyzing the electronic design to identify at least one design module and at least one instance of the design module, wherein said renaming the clock representation associated with each of the signal representations, said identifying the asynchronous clock domain, and said executing timing analysis are executed for each instance of the design module.

11. The method of claim 1, wherein said determining the signal group and the corresponding timing specification associated with one or more signal representations comprises:
assigning a first signal representation to a first signal group in response to determining that a timing specification of the first signal representation matches the timing specification of the first signal group.

12. A computer program product for executing timing analysis of an asynchronous clock domain crossing associated with physical circuit components, the computer program product comprising a computer readable storage medium having program instructions embodied therewith, the program instructions executable by a processor to cause the processor to perform operations comprising:
determining a signal group and a corresponding timing specification associated with one or more signal representations of an electronic design;
for each of the signal representations, renaming a clock representation associated with the signal representation based, at least in part, on the signal group associated with the signal representation;
identifying the asynchronous clock domain crossing between a transmit domain and a receive domain in the electronic design based, at least in part, on one or more renamed clock representations being associated with a signal path in the electronic design, wherein the one or more renamed clock representations are asynchronous to a clock associated with the receive domain;
for each of the one or more renamed clock representations associated with the asynchronous clock domain crossing, executing, via the one or more of the physical circuit components, the timing analysis across one or more signal representations that are associated with the renamed clock representation and that are indicated as crossing between asynchronous clock domains and positioning, via circuit formation machinery, the physical circuit components on an electronic chip based on the timing analysis.

13. The computer program product of claim 12, wherein said operation for renaming the clock representation associated with the each of the signal representations further comprises:
for a first instance of a design module of the electronic design, determining a new clock name for the clock representation associated with a first signal representation based, at least in part, on an original clock name of the clock representation, the signal group associated with the first signal representation, and an identifier of the first instance of the design module; and
replacing the original clock name by associating the new clock name with the first signal representation.

14. The computer program product of claim 12, wherein said operation for executing the timing analysis comprises:
identifying a first subset of the signal representations that are associated with a first signal group;
determining an arrival time associated with each signal representation of the first subset of the signal representations;
for each signal representation of the first subset of the signal representations, determining an actual timing characteristic for the signal representation based, at least in part, on the arrival time; and
for each signal representation of the first subset of the signal representations, determining whether the actual timing characteristic is in accordance with a target timing specification associated with the first signal group.

15. The computer program product of claim 14, wherein the operations further comprise:
determining a first timing specification associated with the first signal group based, at least in part, on a transmit domain clock period associated with the asynchronous clock domain crossing;
determining a second timing specification associated with the first signal group based, at least in part, on a receive domain clock period associated with the asynchronous clock domain crossing; and
selecting the target timing specification associated with the first signal group as a preferred one of the first timing specification and the second timing specification.

16. The computer program product of claim 12, wherein the operations further comprise:
analyzing the electronic design to identify at least one design module and at least one instance of the design module, wherein said operation of renaming the clock representation associated with each of the signal representations, said operation of identifying the asynchronous clock domain, and said operation of executing timing analysis are executed for each instance of the design module.

17. A system for comprising:
a processor;
a physical asynchronous crossing timing analyzer; and
a computer readable storage medium communicatively coupled to the processor, the computer readable storage medium having program instructions embodied therewith, the program instructions executable by the processor to cause the processor to:

determine a signal group and a corresponding timing specification associated with one or more signal representations of an electronic design;

for each of the signal representations, rename a clock representation associated with the signal representation based, at least in part, on the signal group associated with the signal representation;

identify an asynchronous clock domain between a transmit domain and a receive domain in the electronic design based, at least in part, on one or more renamed clock representations being associated with a signal path in the electronic design, wherein the one or more renamed clock representations are asynchronous to a clock associated with the receive domain;

for each of the one or more renamed clock representations associated with the asynchronous clock domain crossing, execute, via the physical asynchronous crossing timing analyzer, timing analysis across one or more signal representations that are associated with the renamed clock representation and that are indicated as crossing between asynchronous clock domains; and positioning, via circuit formation machinery, the physical circuit components on an electronic chip based on the timing analysis.

18. The system of claim 17, wherein the program instructions executable by the processor to cause the processor to rename the clock representation associated with the each of the signal representations further comprise program instructions executable by the processor to cause the processor to:

for a first instance of a design module of the electronic design, determine a new clock name for the clock representation associated with a first signal representation based, at least in part, on an original clock name of the clock representation, the signal group associated with, the first signal representation, and an identifier of the first instance of the design module; and replace the original clock name by associating the new clock name with the first signal representation.

19. The system of claim 17, wherein the program instructions executable by the processor to cause the processor to execute the timing analysis comprise program instructions executable by the processor to cause the processor to:

identify a first subset of the signal representations that are associated with a first signal group;

determine an arrival time associated with each signal representation of the first subset of the signal representations;

for each signal representation of the first subset of the signal representations, determine an actual timing characteristic for the signal representation based, at least in part, on the arrival time; and for each signal representation of the first subset of the signal representations, determine whether the actual timing characteristic is in accordance with a target timing specification associated with the first signal group.

20. The system of claim 19, further comprising program instructions executable by the processor to cause the processor to:

determine a first timing specification associated with the first signal group based, at least in part, on a transmit domain clock period associated with the asynchronous clock domain crossing;

determine a second timing specification associated with the first signal group based, at least in part, on a receive domain clock period associated with the asynchronous clock domain crossing; and select the target timing specification associated with the first signal group as a preferred one of the first timing specification and the second timing specification.

* * * * *